(12) United States Patent
Frolik et al.

(10) Patent No.: US 11,171,484 B2
(45) Date of Patent: Nov. 9, 2021

(54) SYSTEMS AND METHODS FOR RANDOM-ACCESS POWER MANAGEMENT

(71) Applicant: The University of Vermont and State Agricultural College, Burlington, VT (US)

(72) Inventors: Jeff Frolik, Essex Junction, VT (US); Paul Hines, Burlington, VT (US)

(73) Assignee: University of Vermont and State Agricultural College, Burlington, VT (US)

(*) Notice: Subject to any disclaimer, the term of this patent is extended or adjusted under 35 U.S.C. 154(b) by 0 days.

(21) Appl. No.: 16/352,223

(22) Filed: Mar. 13, 2019

(65) Prior Publication Data

US 2019/0214820 A1   Jul. 11, 2019

Related U.S. Application Data

(63) Continuation of application No. 14/772,650, filed as application No. PCT/US2014/019719 on Mar. 1, 2014, now Pat. No. 10,256,631.

(60) Provisional application No. 61/772,533, filed on Mar. 4, 2013.

(51) Int. Cl.
  *H02J 3/14* (2006.01)
  *H04L 12/64* (2006.01)

(52) U.S. Cl.
  CPC .......... *H02J 3/14* (2013.01); *H04L 12/6418* (2013.01)

(58) Field of Classification Search
  CPC ..................... H02J 3/14; H04L 12/6418
  USPC ....................................... 700/286
  See application file for complete search history.

(56) References Cited

U.S. PATENT DOCUMENTS

| | | | |
|---|---|---|---|
| 8,352,094 B2 | 1/2013 | Johnson et al. | |
| 10,169,833 B2 | 1/2019 | Barooha et al. | |
| 2003/0160595 A1 | 8/2003 | Provanzana et al. | |
| 2009/0157835 A1 | 6/2009 | Thompson et al. | |
| 2009/0204268 A1 | 8/2009 | Eaves | |
| 2011/0047552 A1* | 2/2011 | Mergen ................ G06F 9/4893 718/102 |

(Continued)

FOREIGN PATENT DOCUMENTS

| | | |
|---|---|---|
| EP | 2978122 A1 | 1/2016 |
| WO | 2014137845 A1 | 9/2014 |

(Continued)

OTHER PUBLICATIONS

Zhang et al., "A Packetized Direct Load Control Mechanism For Demand Side Management." 51st IEEE Conference on Decision and Control, Dec. 10-13, 2012.

(Continued)

*Primary Examiner* — Kenneth M Lo
*Assistant Examiner* — Michael W Choi
(74) *Attorney, Agent, or Firm* — Downs Rachlin Martin PLLC

(57) ABSTRACT

Systems and methods for distributing electric energy in discrete power packets of finite duration are presented. Systems may include an aggregator for providing power packets to one or more nodes. An aggregator may receive requests for power packets from nodes. In other embodiments, an aggregator may transmit status broadcasts and nodes may receive power packets based on the status broadcasts.

37 Claims, 15 Drawing Sheets

(56) References Cited

U.S. PATENT DOCUMENTS

| | | | |
|---|---|---|---|
| 2011/0062787 A1* | 3/2011 | Pan | H05B 47/00 |
| | | | 307/86 |
| 2011/0233997 A1* | 9/2011 | Tajima | G06F 1/3203 |
| | | | 307/9.1 |
| 2012/0008626 A1 | 1/2012 | Brederveld et al. | |
| 2012/0074909 A1 | 3/2012 | Hondo et al. | |
| 2012/0133337 A1* | 5/2012 | Rombouts | H02J 3/32 |
| | | | 320/155 |
| 2012/0179596 A1* | 7/2012 | Mitsumoto | G06Q 40/04 |
| | | | 705/37 |
| 2012/0245752 A1* | 9/2012 | Borrett | H02J 3/14 |
| | | | 700/295 |
| 2013/0044657 A1* | 2/2013 | Oh | H04W 74/0875 |
| | | | 370/310 |
| 2013/0166081 A1 | 6/2013 | Sanders et al. | |
| 2013/0182558 A1 | 7/2013 | Orten et al. | |
| 2013/0211609 A1* | 8/2013 | Edtmair | G05B 13/02 |
| | | | 700/286 |
| 2013/0234535 A1* | 9/2013 | Sako | H01H 47/002 |
| | | | 307/126 |
| 2014/0114829 A1* | 4/2014 | Forbes, Jr. | G06Q 20/14 |
| | | | 705/35 |
| 2014/0148962 A1 | 5/2014 | Venayagamoorthy | |
| 2015/0012146 A1 | 1/2015 | Cherian et al. | |
| 2015/0077056 A1 | 3/2015 | Bridges et al. | |
| 2015/0357817 A1* | 12/2015 | Van Den Briel | G05B 15/02 |
| | | | 700/291 |
| 2015/0380936 A1 | 12/2015 | Frolik et al. | |
| 2016/0261116 A1 | 9/2016 | Barooah et al. | |
| 2018/0189899 A1 | 7/2018 | Meyn et al. | |

FOREIGN PATENT DOCUMENTS

| | | |
|---|---|---|
| WO | 2016077813 A1 | 5/2016 |
| WO | 2017004487 A1 | 1/2017 |

OTHER PUBLICATIONS

PCT International Search Report and Written Opinion dated Nov. 27, 2017, in related International Application No. PCT/US2017/052828.

Almassalkhi, M., et al., "Packetized Energy Management: Asynchronous and Anonymous Coordination of Thermostatically Controlled Loads," IEEE: 2017 American Control Conference (ACC), May 24-26, 2017.

Zhang et al., "A Novel Packet Switching Framework with Binary Information In Demand Side Management." 52nd IEEE Conference on Decision and Control, Dec. 10-13, 2013.

Mathieu, Johanna L., "State Estimation and Control of Electric Loads to Manage Real-Time Energy Imbalance." IEEE Transactions on Power Systems, vol. 28, No. 1, Feb. 2013.

Meyn, et al., "Ancillary Service to the Grid Using Intelligent Deferrable Loads." IEEE Transactions on Automatic Control, vol. 60, No. 11, Nov. 2015.

U.S. Appl. No. 15/712,089, filed Sep. 21, 2017, US2018/0082385A1, Published.

U.S. Appl. No. 16/421,171, filed May 23, 2019, US2019/0324415A1, Published.

* cited by examiner

SYSTEMS AND METHODS FOR RANDOM-ACCESS POWER MANAGEMENT

CROSS-REFERENCE TO RELATED APPLICATIONS

This application is a continuation of U.S. patent application Ser. No. 14/772,650, filed on Sep. 3, 2015, and titled "Systems and Methods For Random-Access Power Management Using Packetization," now allowed, which application is a 371 of PCT Patent Application No. PCT/US2014/019719, filed on Mar. 1, 2014, and titled "Systems and Methods For Random-Access Power Management Using Packetization," which application claims the benefit of priority of U.S. Provisional Patent Application Ser. No. 61/772,533, filed on Mar. 4, 2013. Each of these applications is incorporated by reference herein in its entirety.

STATEMENT REGARDING FEDERALLY SPONSORED RESEARCH

This disclosure was made with government support under award no. TRC039 awarded by the United States Department of Transportation. The government has certain rights in the disclosure.

FIELD OF THE DISCLOSURE

The disclosure relates to the equitable allocation of a supply of electricity to a number of loads.

BACKGROUND OF THE DISCLOSURE

Plug-in hybrid electric vehicles ("PHEVs") and pure battery electric vehicles (as a group plug-in electric vehicles, PEVs) promise to facilitate a transportation future that is less dependent on liquid fossil fuels. However, as PEV market penetration increases, vehicle charging could strain aging power delivery infrastructure. A number of recent papers have shown that increases in PEV charging could have detrimental impacts on medium and low voltage distribution infrastructure, particularly where PEV adoption is highly clustered. With mass-produced PEVs coming to market and a range of charging standards (AC Levels 1-3) established, it is increasingly important to understand and mitigate negative impacts that PEV charging might have on distribution system components, such as underground cables and transformers.

Some charging of PEVs is envisioned to occur at workplaces, shopping centers, etc., where the power distribution is already sufficient to support commercial endeavors. However, it is more likely that PEV charging will primarily occur at a person's home where the existing power distribution system has been designed for residential scale service, which is typically limited by 15-25 kVA transformers and underground cables that have capacities on the order of 100 kVA. At Level-1 charging rates (~1.4 kW), electric vehicle charging can double the electricity use of an average U.S. residence (from 1.2 kW to 2.6 kW). At Level-2 charging rates (~7 kW), residential loads increase even more dramatically. This additional load can have substantial detrimental effects on residential distribution infrastructure, particularly transformers and underground cables, even under moderate PEV penetration scenarios. For example, transformers, substations, and underground cables can age rapidly if operated beyond their specified thermal limits due to the additional power draw by large loads.

Implementing effective charge management (CM, also known as smart charging) methods is one step to facilitate the smooth integration of PEVs. Several previous studies show that with effective CM schemes it is possible to support large numbers of electric vehicles even with constrained electric power infrastructure. In many cases it is also possible for PEVs to not only avoid negative impacts on the power grid, but also to provide grid services, through Vehicle-to-Grid (V2G) technology.

The CM and V2G control schemes that have been proposed in the literature, or in industry, generally fall into one or both of the following categories:

1. Centralized optimization or control methods in which each vehicle submits information to a central authority, which in turn solves an optimization problem that produces a charging schedule for each vehicle.

2. Decentralized methods, in which either utilities set a pricing scheme (e.g., a fixed time-of-use price) and vehicles self-schedule based on those prices, or a market-based scheme is used to generate prices to which vehicle charge management devices respond.

These two approaches have a variety of advantages and disadvantages.

Centralized schemes have the advantage that they can, under some conditions, produce economically optimal outcomes by minimizing costs and avoiding constraint violations in the distribution system. However, optimization/control methods require that vehicle owners provide information (e.g., willingness to pay or anticipated departure times) to a central authority and require that the vehicle owner give up at least some autonomy over the charging of their PEV. While the load serving entity would likely compensate the vehicle owner for this loss of control with a reduced rate for electric energy, this loss of autonomy could be an impediment to adoption of CM schemes. In addition, vehicle owners are unlikely to know in advance their exact travel schedule, which complicates the problem.

The use of dynamic pricing schemes has been suggested to mitigate the detrimental effects of PEV charging. However, in order for a dynamic pricing scheme to mitigate localized transformer or cable overloading, utilities must install infrastructure that:
(1) determines current capacity and demand; (2) adapts local rates based on this capacity and demand; and (3) relays this rate information to each customer. Furthermore, price-based schemes will require a consumer charging system that: (1) can communicate with the power distribution system; and (2) enables customers to choose to charge based on fluctuating prices or at least have technology installed for making charging decisions. Note that a price-based approach typically requires the power distribution system to know specific information about specific customers, which exacerbates existing concerns about data privacy and security in a Smart Grid environment.

Simple time-of-use pricing schemes, such as a reduction in rate for nighttime charging, do not have these disadvantages as owners have flexibility in choosing how they will respond to the change in prices. However, very simple price-based schemes are unlikely to produce optimal outcomes in terms of avoiding overloads in the distribution network, or minimizing costs. In fact, such time-differentiated pricing could produce new load peaks that increase, rather than decrease aging in the distribution infrastructure.

The stochastic nature of charging behavior is particularly important to highlight. PEV arrival and departure times vary substantially between owners, days, and within days. Feeder load variability and uncertainty will grow even further with an increase in distributed renewable generation. Vehicle CM schemes that do not adapt well to such uncertainty are unlikely to be successful.

Additionally, other large loads, such as, for example, air conditioning systems, tax the power distribution grid in similar fashion. Accordingly, there is a need for a charge management scheme that enhances the equitable distribution of power to customers, improves the optimal use of the available supply of power, and offers better privacy to customers.

BRIEF SUMMARY OF THE DISCLOSURE

Given the above-described variability in system capacity and in customer loads, the present disclosure is directed to systems and methods with a charge management approach that is simple, yet robust to randomness and that has substantial advantages over previous approaches which require significant infrastructure upgrades and expose privacy and security concerns. The disclosed systems and methods are advantageous in that they can be easily adapted to reduce the bandwidth required for communications between the power grid and electric vehicles. This may make smart-charging more feasibly within the context of low bandwidth and high-latency communications systems that are common in current advanced metering infrastructure ("AMI") systems.

The present disclosure treats PEV charging as a random access problem where charge is delivered through many 'charge-packets.' A charge packet (or "power packet") is a quantity of electric energy delivered at a rate (power) over a finite period of time (e.g., 1 kWh delivered at 6 kW over 10 minutes). The packetization of charge allows distribution system objectives (i.e., efficient use of available resources without overloading) and customer objectives (reducing travel costs) to be achieved simultaneously. Leveraging this approach, the present disclosure presents an exemplary decentralized charge management strategy, which preserves customers' privacy more than many existing charge management schemes. Simulations of this method indicate that the cost increase of the charge-packet method over an omniscient centralized optimization method (which is untenable in terms of information requirements) is only 0.9% to 5.2%. Simulation results also show that the introduction of randomness in vehicle charging enables constrained feeders in the power distribution infrastructure to be fairly and anonymously shared.

While the present disclosure is described and illustrated through examples using plug-in electric vehicles, the methods are not intended to be limited by such examples. The present disclosure is easily used for any type of load or a mix of types of loads (e.g., air conditioners, plug-in vehicles, pool heaters, etc.) As such, the method could easily be adapted to, for example, reducing overloads due to simultaneous thermal (HVAC or water heating) loads.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
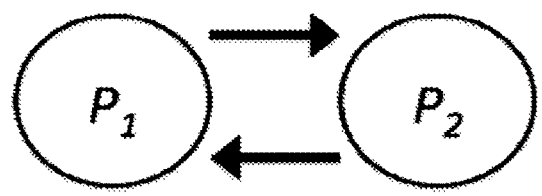
FIG. 1 depicts a two-state automaton where $P_2$ corresponds to a higher probability of PEV charge request and $P_1$ a lower.

The present disclosure can be implemented as a method or system for managing the power supplied to electrical loads (nodes) in a residential distribution system in a manner that requires very little centralized coordination.

Residential power distribution systems can be viewed as a resource that is limited due to thermal limits of medium voltage transformers and underground cables. These resources are used, for example, to charge PEVs, power air conditioners, and to power other large electrical loads. These resources have variable capacity for providing power depending, for example, on other demands on the system. In the example of PEV charging, the capacity to provide power for PEV charging varies depending on other loads (e.g., air conditioners and large appliances) and ambient temperatures. In addition, the driving patterns of PEV owners will vary tremendously, from one customer to the next. Thus, the PEV charging problem can be considered as a system where both supply (system capacity) and demand (PEV load) are random.

A system of the present disclosure comprises an aggregator in electrical communication with an electrical distribution network. The aggregator may be configured to receive requests for power packets, determine whether or not each request may be granted, and respond to the requests. The system may further comprise a plurality of request stations (or "nodes"). Each request station of the plurality of request stations (e.g., PEV charging stations, air conditioners, pool heaters, etc.) is configured to request power packets during time intervals (each, an epoch). In some embodiments, each request station comprises an automaton designed to send a request to the aggregator (either directly or as a broadcast) for a given epoch according to a probability of the automaton making a request during that epoch. In some embodiments, the probability of a node making a request during any particular epoch may change according to rules (as further defined below). Node epochs may or may not align with one another. In other words, the start of an epoch for a node may or may not be at the same time as the start of an epoch for a different node.

The present disclosure can be embodied as a system 10 for providing electrical power comprises an aggregator 12 in electrical communication with an electrical power source 90 (e.g., the power grid). The aggregator 12 is configured to provide electrical power from the electrical power source 90 as a plurality of discrete power packets each power packet having a finite duration. In embodiments of the present disclosure, the duration of a power packet may be the same or different from the time intervals between charge requests. In some embodiments, the duration of power packets may or may not be the same. In some embodiments, the time intervals may or may not be the same. For convenience, the remainder of the disclosure will discuss embodiments wherein the times intervals and charge packet durations are equal. However, such discussion is not intending to be limiting, and the scope of the disclosure encompasses the alternative time intervals and charge packet durations.

The system 10 further comprises one or more nodes 20 (sometimes referred to herein as request stations) in communication with the aggregator 12. As mentioned above, nodes 20 may be PEVs (PEV chargers), air conditioners, heaters, or any other large electrical load. Each node 20 is configured to request a power packet from the aggregator 12. For example, the node 20 may transmit a request for a power packet to the aggregator 12. Embodiments where nodes 20 transmit to the aggregator 12 are termed "duplex" embodiments. The aggregator 12 receives each request for a power packet from the one or more nodes 20 and determines whether to grant or deny each request. The aggregator 12 determines to grant or deny node 20 requests based on (at least) availability of electrical power from the electrical power source 90. If a request is granted, the aggregator 12 provides a power packet to the node 20 corresponding to the granted request. It should be noted that the aggregator 12 may provide a power packet to a node 20 in any way. For example, the aggregator 12 may provide a power packet by authorizing or otherwise instructing a node 20 to use power and the node 20 will utilize power from the power grid. In some embodiments, if the request is denied, the aggregator 12 sends a denial message to the requesting node 20. In other embodiments, if the request is denied, the aggregator 12 does not provide a notification to the requesting node 20. At the end of an epoch (i.e., the beginning of the next epoch), each node 20 is configured to determine whether additional power is required, and send an additional request accordingly.

In an embodiment where aggregator-node communication happens in only one direction (a "simplex" embodiment), the aggregator 12 sends a periodic broadcast of its state (either overloaded or not-overloaded). Each node 20 is configured to request a power packet by listening for the aggregator 12 broadcast to determine the state of the aggregator 12. When the node 20 determines that the aggregator 12 state is "not-overloaded," the request is approved and the node 20 obtains power (e.g., connects its electrical load to power) for the duration of a power packet. At the end of the power packet duration, the node 20 may request another power packet by listening for the aggregator 12 broadcast. In this way, the aggregator 12 is said to have provided a power packet to the node 20. When the node 20 determines that the aggregator 12 is "overloaded," the node 20 does not connect to power and waits for the next epoch. At the next epoch, the node 20 may request a power packet by listening for the aggregator 12 broadcast.

In some embodiments, one or more nodes 20 are configured to request a power packet during an epoch according to a first request probability $P_1$. For example, where $P_1=1$, the node 20 will request a power packet during each epoch. The nodes 20 may each have a first state wherein the nodes have the first request probability, and a second state wherein the nodes 20 each have a second request probability, $P_2$. The first request probability may be greater than the second request probability. The nodes 20 may be configured to change between states based on the granting/denial of pack requests. For example, a node 20 in the first state may be configured to remain in the first state if its packet request is granted by the aggregator 12, or change to the second state if the request is denied by the aggregator 12. Also, a node 20 in the second state may be configured to remain in the second state if its packet request is denied by the aggregator 12, or switch to the first state if the request is granted by the aggregator 12.

In other embodiments, one or mode nodes 20 may have a third state having a third request probability, $P_3$, which is less than the second probability. One or more of the first, second, or third states may be selectable by way of a priority selector. In this way, a person operating a node 20 may have the option of selecting a higher probability state, for example, where there is a higher urgency.

Systems according to embodiments of the present disclosure may further comprise one or more sensors 14 in communication with the aggregator 12. The one or more sensors 14 may be configured to provide a signal to the aggregator 12 according to conditions of the electrical distribution network (e.g., current load, temperature of one or more component, ambient temperature, weather conditions, etc.) such that the determination of the aggregator 12 whether or not to grant a power packet request may be altered based on signal(s) received from the one or more sensors 14. Similarly, the aggregator 12 may be programmed with distribution network capacity data for the request determination. For example, the aggregator 12 may be programmed with a maximum load allowed on the distribution network and additionally programmed to allow only a predetermined percentage of the maximum load during a predetermined window of time.

Systems according to embodiments of the present disclosure may further comprise an upstream aggregator 16 for hierarchical determinations of power packet request grants. In such embodiments, the aggregator 12 (or each aggregator 12 in cases having more than one aggregator) will request power from the upstream aggregator 16. These requests for power from the aggregator(s) 12 to the upstream aggregator 16 may be performed similar to or different from requests from the nodes 20 to the aggregator 12. For example, the epoch parameters (e.g., length of time) may be different.

As described above, some request stations 20 may comprise a selector 22. In some embodiments the selector 22 is configured to allow the user of the request stations 20, 22 (the customer) to select between more than one option. The selector may be used, for example, to select between "urgent" or "standard" need. The request station may comprise one or more sensors in communication with the request station. For example, a sensor may determine the charge level of a PEV and provide such information to the request station. In this example, the request station may use the charge level of the PEV to automatically switch between "urgent" and "standard" need. In other embodiments, the sensor may be a temperature sensor, or any other sensor (or combination of sensors) useful for informing an automaton of the request station.

The present disclosure may be embodied as a method 100 for managing electrical loads on a distribution network comprising the step of receiving 103 a request for a power packet, the power packet being a supply of electricity for a finite time interval. The method 100 comprises determining 106 whether sufficient capacity exists on the distribution network to grant the request. The method 100 may include the step of transmitting 109 a response to the received 103 request, wherein the transmitted 109 response indicates that the request is granted. In some embodiments, a response may be transmitted 109 wherein the response indicates that the request is denied. In other embodiments, no response is sent when the received 103 request is denied, and the lack of a response is presumed to be a denial. Either of the received 103 request and/or the transmitted 109 response may be sent as a broadcast or a private communication between devices of the distribution network. When a request is granted, a power packet is provided 112 to the requesting device. As previously stated, the power packet may be provided 112 as, for example, an authorization for the requesting device to obtain power.

The present disclosure may be embodied as method 200 for requesting power from a distribution network comprising the step of determining 203 the current request state of a node. For example, a node may determine 203 its own request state. The method 200 for requesting power further comprises determining 206 whether or not to request a power packet based on the determined 203 request state and a request probability that a request should be sent in the current state. If a request should not be sent, waiting a predetermined time (an epoch) and repeating the method 200. If a request should be sent, a power packet is requested 209 from the distribution network. For example, a power packet may be requested 209 by transmitting 212 a request to an aggregator on the distribution network. In another embodiment, a power packet by receiving 215 a broadcast state from an aggregator. The method 200 may comprise waiting a predetermined period of time for the request to be granted. If the request is granted, then receiving 218 a power packet and repeating the method. If the request is not granted, then the request state may be changed 221 to a different state, wherein the changed state has a request probability which is different than the first request probability. The new request probability may be lower than the request probability. The method 200 is repeated until the node reaches a completion state.

The present disclosure may be embodied in an aggregator 12 having a source interface 13 in connection with an electrical distribution network. The source interface 13 is in electrical communication with an electrical power source 90. The source interface 13 may be configured to be in communication with one or more nodes 20. In another embodiment, the aggregator 12 has a load interface 15 in communication with one or more nodes 20. The aggregator is configured to perform the aggregator processes as described above. For example, the aggregator 12 may further comprise a processor 17. The processor 17 may be programmed. To receive requests for power packets from one or more nodes 20, determine whether to grant or deny each received request, and provide a power packet to each node according to the corresponding request determination.

The present disclosure may be embodied as a node 20 for requesting electrical power from an aggregator 12. The node 20 comprises an aggregator interface 21 in electrical communication with the aggregator 12. The node 20 also include a state register 24 configured to record a request state of the node 20. The state register 24 may be of any type known in the art, for example, a memory component. The node 20 is configured to perform any of the node processes described herein. For example, the node 20 may have a node processor 25. The node processor 25 may be programmed to retrieve a node (request) state from the state register 24; determine, based on a request probability of the node state, whether or not to request a power packet; and request a power packet from the aggregator 12 according to the request determination.

Further Discussion

While managing the charging of each PEV according to a predetermined schedule is attractive in the ideal to ensure that the power system's capacity is utilized fully, it is recognized that both PEV needs and the system's capacity are dynamic, random quantities. As such, managing the charging of each PEV according to a predetermined schedule would require significant coordination and communications. This communication would necessarily involve detailed customer information and thus create possible security/privacy issues. The present disclosure is directed to an alternative approach for managing PEV charging, based on a network of charge-management automatons, one per vehicle. This probabilistic automaton approach allows local determination of whether or not to request a charge during any particular time interval (i.e., an "epoch"). The probability of that charge request is dictated by the state of the automaton. Automatons are managed through a broadcast response by a centralized charge manager (nominally located at the distribution station).

Fundamental to this approach is that the PEV charging is conducted over many discrete time intervals. These intervals may be referred to as "power packets" or "charge packets." The packetized approach ensures that all PEVs regularly compete for charging capacity, which is especially important in order to maintain equal access to all vehicles under conditions where the distribution system capacity becomes constrained. Generally, in embodiments of the present disclosure, automatons request a charge packet.

A probabilistic N-state automaton was developed that illustrated the ability to control participation of random autonomous agents over a wide range of control values. A simple embodiment (N=2) of the probabilistic automaton is shown in FIG. 1. If the node (for example, a PEV, a PEV charger, an air conditioner, etc.) is in the lower state, it will transmit during a particular epoch with probability $P_1$. In the PEV application, this "transmission" corresponds to the PEV requesting a charge for a finite length of time (or epoch). If the request is successful and therefore rewarded by the end user (e.g., a neighborhood feeder), the node will move to the higher state and transmit during the next epoch with probability $P_2 > P_1$.

If a PEV connects to charge and there is insufficient capacity in the distribution system to support this charging, then the PEV's request will be denied and its automaton will move to a lower state (which reduces the probability of a request occurring in the subsequent epoch). A charge management agent, notionally located at the distribution substation, does not track which PEV is requesting charge or the state of any particular PEV's automaton. All requests are treated equally and PEVs adjust their state autonomously based only on the feedback provided by the charge manager.

In order to attempt to level the load on the distribution system over the course of a day, a utility may invoke a tariff structure for electric vehicle smart charging having different rated for "urgent" and "standard" charging modes. In such an environment, automatons may take into account an urgency of the customer (e.g., the vehicle owner). The priority of charge is selected by the customer by way of a switch at the charging station. This information does not need to be transmitted to the utility, other than for billing purposes (which can be handled at the customer's meter), thereby reducing privacy concerns.

A significant advantage of the proposed approach is that the power distribution system can be blind to the vehicle from which the charge requests are being made and thus anonymity/privacy of customers is maintained. The management approach is simply to determine whether capacity in the systems exists, or not. The individual customers, through their automatons, manage/adjust their behavior accordingly.

Figure 14:
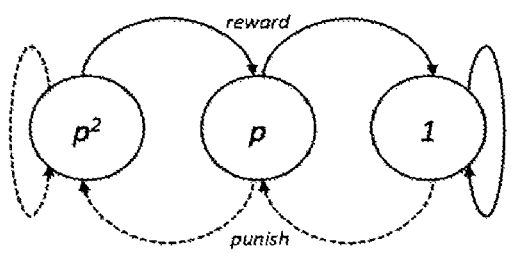
FIG. 14 depicts a three-state automaton of another embodiment of the present disclosure where p is the probability of charge request during an epoch and is proportional to the 'urgency' set by the PEV owner (solid lines indicate state changes when automaton is 'rewarded'; dotted lines are state changes associated with 'punishments')

Another embodiment of an automaton (N=3) is shown in FIG. 14. In this embodiment, if the PEV charger is in the highest state (i.e., right-most state in FIG. 14), it will transmit a charge request during the current epoch with probability 1. If the request is successful and therefore rewarded by the charge manager, the PEV will be charged for the duration of the packet and the automaton will stay in that highest state and request a charge again in following epoch. Alternatively, if there is insufficient capacity in the distribution system to support additional charging, the PEV's request will be denied and its automaton will move to a lower state (which reduces the probability of a request occurring in the subsequent epoch to p).

As a result of this approach, each PEV requests a charge independently every epoch based on the probability associated with its current state (e.g., 1, p, $p^2$ for the automaton in FIG. 14). The charge manager does not track which PEV is requesting charge or the state of any particular PEV's automaton. All requests are treated equally and PEVs adjust their state autonomously based only on the feedback provided by the charge manager.

Embodiments of automatons can be readily adapted to dynamic retail electricity tariffs. Notionally, a customer has a certain 'urgency' to complete a charge over a fixed amount of time. This urgency may be tied to the price the customer is willing to pay for charging. If this premise is accepted, then there are two (if not more) ways to leverage it for PEV charge management (or ability of an air conditioner to operate during the epoch, etc.), under the power packet approach.

In some embodiments, the customer is allowed to set their PEV charger in either "urgent" or "standard" modes. This could establish a price threshold at which charging will no longer be requested. The higher the urgency, the higher is this price threshold. In the design of an automaton, the current price can influence the state at which the automation is in. In other embodiments, customers pay for the right to request a charge. That is, the state of the customer's automaton probability dictates the price paid for every met charge request. Urgent customers may set their automaton probability (in FIG. 14) top=1 knowing that they will be requesting charge more frequently and thus be receiving power packets more quickly. A less urgent customer may set their urgency lower (e.g., p=0.5) and on average will request at half the rate. Should this customer's request be accepted, the power packet would be received at a lower cost than for the first customer. However, if charging were denied due to capacity issues, the PEV would, for example, be punished thus moving it to a lower state (e.g., $p_2$=0.25) and thereby reducing its request rate. This approach will result in less-urgent customers having a lower overall probability of completing charge than more-urgent customers. That being said, for the same amount of charge, the less-urgent customer pays a lower price.

In such approaches, the customer has control over what price they are willing to pay to meet their charging needs. To implement these approaches, the charge manager will simply need to determine and present to all customers either a price-per-packet or a price-per-request rate. Based on price thresholds established by the customer, an automaton can be developed (locally, i.e., anonymously) that reflects their urgency to charge. That is, the request probability will increase with urgency and will be reflected by increasing the values loaded in the automaton's states (i.e., p in FIG. 14).

More generally described, some embodiments of a probabilistic automaton implement the Gur game. A probabilistic N-state automaton illustrates the ability to control participation for a larger range of nodes and with improved fairness of participation among nodes. For PEV charging, this latter automaton design was leveraged, of which a simple version (N=3) is presented in FIG. 7.

As shown in the state diagram (FIG. 7), if the node (PEV) is in its middle state, it will transmit during a particular epoch (time period) with probability $P_2$. In the PEV application, this "transmission" corresponds to the PEV requesting a packet of charge for a finite length of time (or epoch). If the request can be supported by the infrastructure, the vehicle is allowed to charge for one epoch. With a successful request, the state machine moves to the next higher probability state $P_1$ and transmit during the next epoch with probability $P_1 > P_2$. If the request is not successful, the PEV would not charge for the epoch, would move to the next lower probability state $P_3$, and would request at the next epoch with probability $P_3 < P_2$. This automaton approach has been shown to adapt to scenarios where the distribution capacity varies over time.

Figure 7:
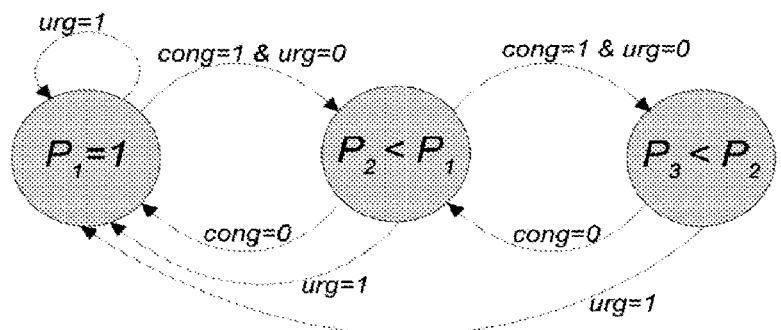
FIG. 7 depicts a three-state (N=3) automaton where $P_2$ corresponds to a lower probability of PEV charge request than $P_1$, and $P_3$ to a lower probability than P2 (in case of charge urgency (urg=1) the state machine will stay at $P_1$, but if there is no charge urgency by driver's call (urg=0), and the power transformer was congested (cong=1), i.e., a charge request was denied to avoid transformer overload, the PEV state machine will go to a state with lower probability. If charge urgency was set by the driver (urg=1) the state machine will go to $P_1$ with the highest probability)

For fair and consistent treatment across all PEVs, each user's automaton would be of the same design. However, in order to ensure that drivers who need to charge their vehicles more quickly are able to do so, the design can be adjusted to give such vehicles a higher priority. 'Urgent' users willing to pay for preferential charge allocation can be accommodated, for example, with a different automaton design having higher state probabilities than that for 'non-urgent' customers or with an automaton (as illustrated in FIG. 7) where 'urgent' users may request charge at each epoch.

Packetization of PEV Charge

Why is PEV home charging a candidate for packetized delivery? Firstly, a 5-8 kW AC Level-2 PEV charger is likely to be the highest power load in a home; if many chargers in a neighborhood were to run simultaneously, substantial infrastructure degradation could result, particularly in older distribution systems. However, most PEV owners with Level-2 chargers will not need to charge their vehicles immediately upon vehicle arrival at home. Given fast charge rates, there is likely to be more than sufficient time overnight to bring a PEV's battery to the desired state of charge ("SOC") for the next day's driving. In short, it is typically not necessary that PEV charging be continuous from start to finish.

Packetized charging breaks the required charge time into many small intervals of charging (i.e., 'charge-packets'). For example, 4 hours of Level-2 charging could be accomplished with 48, 5-minute charge-packets. A PEV (or its charge station, etc.) would request the authorization to charge for the packets duration. A charge-management coordinator device at the distribution substation would assess local conditions and determine whether additional load on the system can be accommodated. If allowed, the PEV will charge for the duration of the packet and then submit new requests for subsequent packets until the battery is fully charged. If charging cannot be accommodated, the PEV resubmits a request at a later time.

Other random-access control methods developed for random-access channels include Aloha, Slotted-Aloha and Carrier Sense Multiple Access (CSMA), each of which requires very little (if any) data exchange between the source and loads in the system. Any random-access control method(s) may be used with the presently disclosed packetized charge methodology.

Exemplary System-Level Implementation Approaches

Key advantages of the proposed packet-based CM approach are that: (1) the scheme can be used to manage constraints anywhere in a distribution system; (2) the communication requirements are minimal; and (3) customer privacy is maintained. Here these advantages are illustrated by describing potential implementation approaches and contexts.

The packetized method and systems can be implemented to mitigate overloads at multiple locations within a distribution system. Embodiments could be used to avoid over-temperature conditions on, for example, a medium-voltage distribution transformer, an underground cable, a low-voltage service transformer; under-voltage conditions in any of these example locations; or (using a hierarchical design) a combination of such constraints. In each case, the charger automaton would communicate with an aggregator responsible for managing one or more particular constraints (e.g., feeder or transformer overloads). For example, in the case of medium-voltage system constraints, the aggregator could be located at the distribution substation. For the case of service-transformer constraints, the aggregator could be located at the transformer. The only data required to flow from the PEV charger to the aggregator would be charge-packet requests. The aggregator would respond to requests based on available capacity. In each of these cases, communications would occur over Advanced Metering Infrastructure systems, which typically have very low communications bandwidth and high latencies, emphasizing the importance of a scheme that makes limited use of this bandwidth.

It is also possible to implement communications for the packetized methods with either one-way (simplex) or two-way (duplex) data flows. In the two-way case, the aggregator may respond to each request individually with either an approval or denial. In the one-way case, the aggregator may broadcast the state of the resource (either overloaded, or not-overloaded) and chargers would make their request locally by randomly "listening" to the broadcast signal. The latter version has advantages in terms of privacy, as the transformer is blind to who is receiving permission to charge.

Combinations of these schemes could be employed simultaneously. That is, a PEV charger might only send requests to an aggregator at the substation, if a service transformer's broadcast signal indicated that there was local capacity available. In other examples, automatons for PEVs may have a first scheme, while automatons for air conditioners may have a second scheme (which may be different than the first scheme).

EXAMPLES

The following example sets are intended to be non-limiting and used for the purpose to further describe the techniques of the present disclosure. It should be recognized that other automaton designs may be used, more than one automaton design may be used, and other implementations of charge management systems using packetized charges are all within the scope of the present disclosure.

Example Set 1—2-State Automaton

To illustrate the proposed method, a simple and readily scalable example is presented in which the charging of 100 PEVs needs to be managed. In this set of examples, Level-1 home charging for the vehicles is assumed, and it is assumed 10 hours (i.e., 120, 5-minute power packets) is required for a vehicle to complete a full charge (0-100%). Three examples (1A, 1B, and 1C) are considered to illustrate the flexibility and robustness of the approach rather than to provide specific performance numbers. Table 1 summarizes the simulation constraints for example set 1. For each of these examples, a normal distribution of evening times when the PEV charging can start and when it can end was assumed, corresponding to PEV home arrival and departure times. For each PEV, a vehicle plug-in/plug-out time was established to determine the window of charging opportunity (see FIG. 2).

TABLE 1

Simulation Parameters for Example Set 1

| Parameter | Distribution |
| --- | --- |
| plug-in time | normally distributed between 1700 and 1900 hours |
| plug-out time | normally distributed between 0600 and 0800 hours |
| power packet duration | 5 minutes |
| charge time required | Example 1A & 1B - All vehicles 10 hours (i.e., 120 'packets') Example 1C - Uniformly distributed between 5 and 10 hours |

Example 1A: Fixed Demand, Variable Supply

Example 1A is illustrative of a "worst-case scenario" where all 100 PEVs require the maximum 10 hours of charging during the evening (i.e., each PEV requires 120, 5-minute power packets). In this example, the simple N=2 state automaton of FIG. 1 was set to have $P_1=1.0$ and $P_2=0.5$ for all 100 PEVs.

Figure 3A:
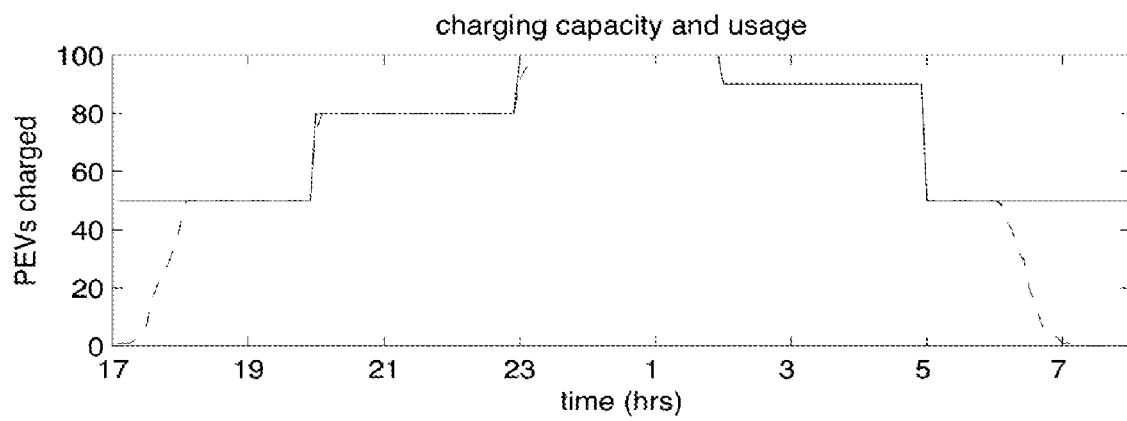
FIG. 3A is a graph showing the capacity (solid) and load (dashed) of an exemplary system.
Figure 3B:
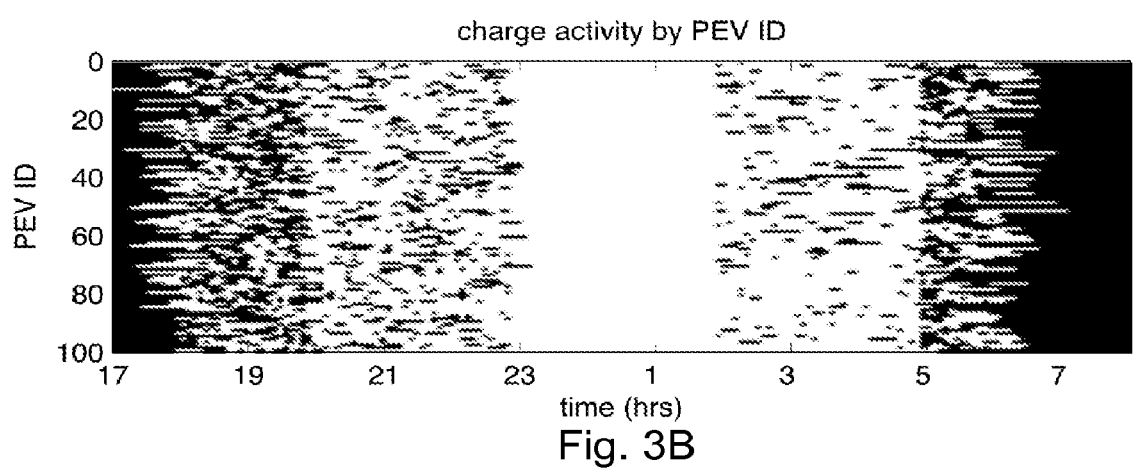
FIG. 3B depicts the charge activity of the exemplary system over the 15-hour window by PEV ID.
Figure 3C:
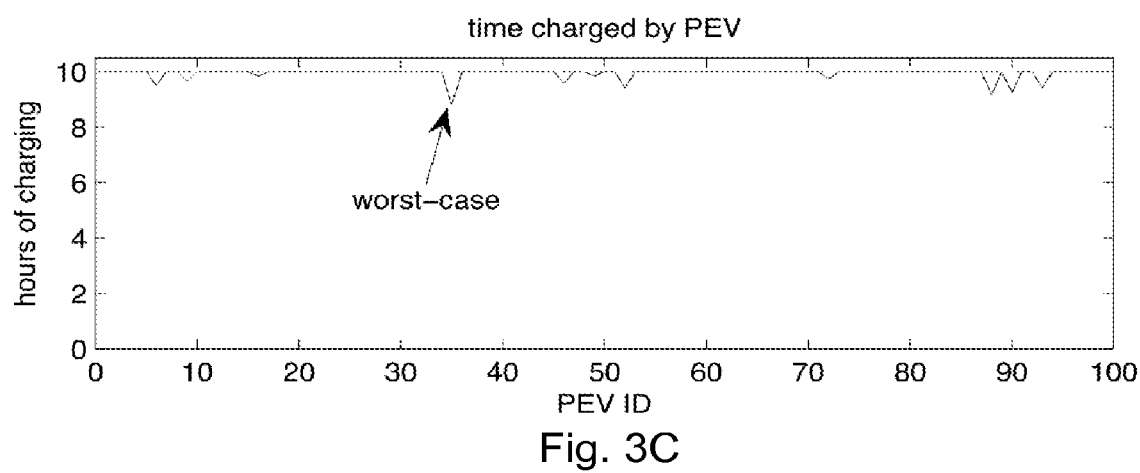
FIG. 3C depicts the charging completed by each PEV (x-axis) during the 15-hour window.

FIGS. 3A-3C show the ability of automaton-based random access approach of this example to fulfill the charging requests of 100 PEVs when the power system has variable capacity. In FIG. 3A, it can be seen that under the conditions where the supply is variable (solid line—50, 80, 100, 90, and 50 PEVs), the automaton approach allows the PEVs in an uncoordinated manner to utilize the capacity (dashed line) nearly completely. One will note some latency as the capacity changes from 80 to 100 PEVs. This is a result of many PEVs being in their lower probability state (as the capacity was previously constrained) and thus not requesting permission to charge in the same epoch. FIG. 3B shows the charge activity (white spaces) of each PEV (by PEV ID along the y-axis) over time (x-axis) of the 100 PEVs being considered.

Note that from 1700 hours to 1900 hours we see the effect of the distributed plug-in times. We also note a great deal of 'packetization' in the charging due to the system only being able to handle 50 PEVs initially. As capacity increases, PEVs are able to charge on a more consistent basis. At full capacity (2300 to 0200 hours) all PEVs are able to charge continuously. Competition for and sharing of charging resources is reinstated when capacity drops at 0200 hours and then again at 0500 hours, resulting in increased turnover in the use of the available capacity.

Figure 2:
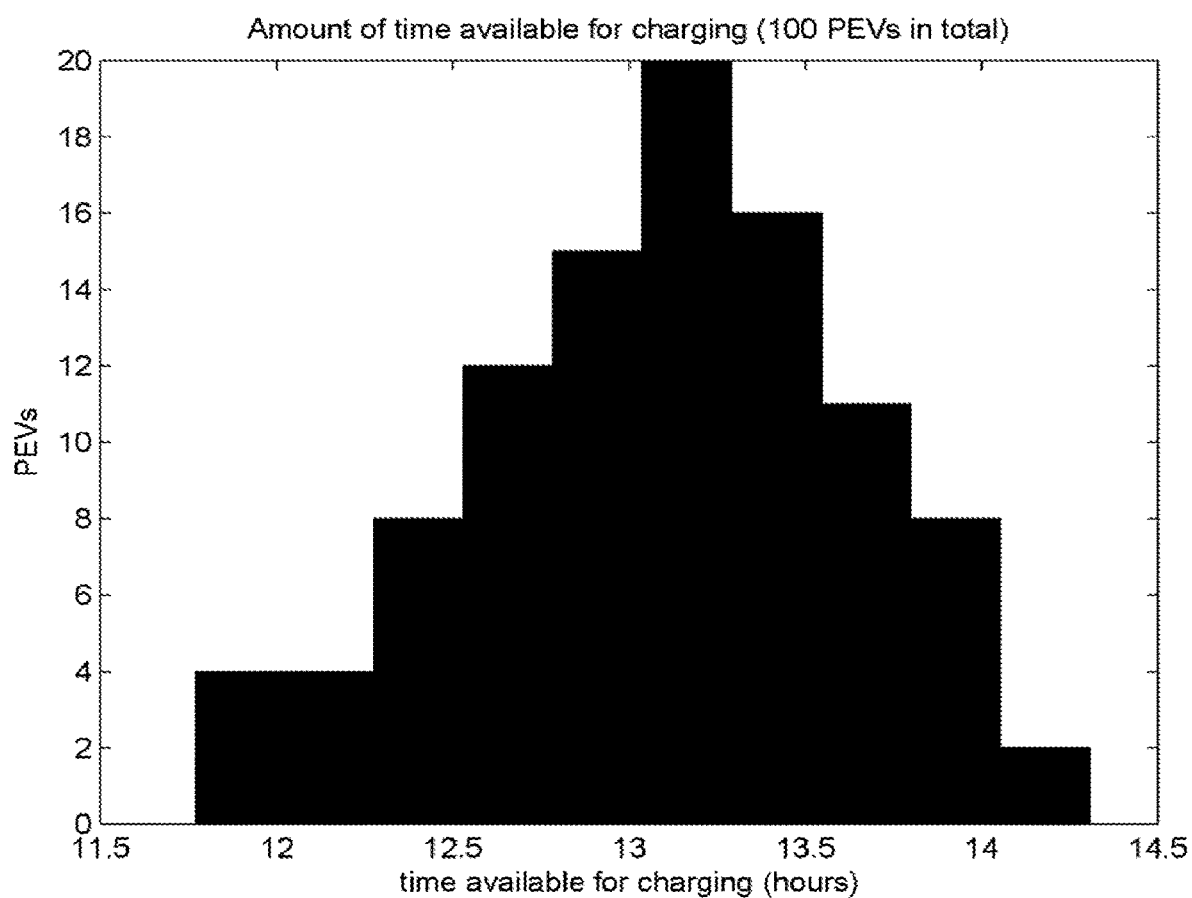
FIG. 2 is a graph showing the distribution of charging window durations for PEVs plugging in between 1700 hours and 0800 hours.

The automaton rewards and punishments are communicated by the charge manager based on system capacity and do not take in account which PEV is making the request. A measurement of effectiveness is whether this approach will result in all PEVs receiving their requisite charge. FIG. 3C shows the resulting charge distribution by PEV ID. Overall, Example 1A had 1110 PEV·charge-hours available over the 15-hour window from 1700 hours to 0800 hours, of which an average PEV was plugged in for only 13 hours (FIG. 2). Using the random access approach (again, with no a priori scheduling) the presently disclosed method was able to achieve 994.25 PEV·charge-hours of the 1000 PEV·charge-hours requested (i.e., 99.425% success in meeting demand). For this example, most PEVs were able to charge fully and the worst-case charge for a PEV was >88% (for PEV ID=35).

By increasing the number of states and choosing the probabilities of each appropriately, latency in response can be drastically reduced. In short, a 'better' automaton would be expected to decrease the noted latencies and to further increase this efficiency.

Example 1B: Fixed Demand, Insufficient Supply

In Example 1B, the capacity profile of FIG. 3A was utilized and the (supply) capacity was reduced across the board by 75% and then to 50%. That is, the overall capacity during the charging window is reduced from 1100 PEV·charge-hours to 832.5 PEV·charge-hours, then to 555, respectively. As such, neither of these cases are capable of meeting the fixed demand of 1000 PEV·charge-hours.

Figure 4:
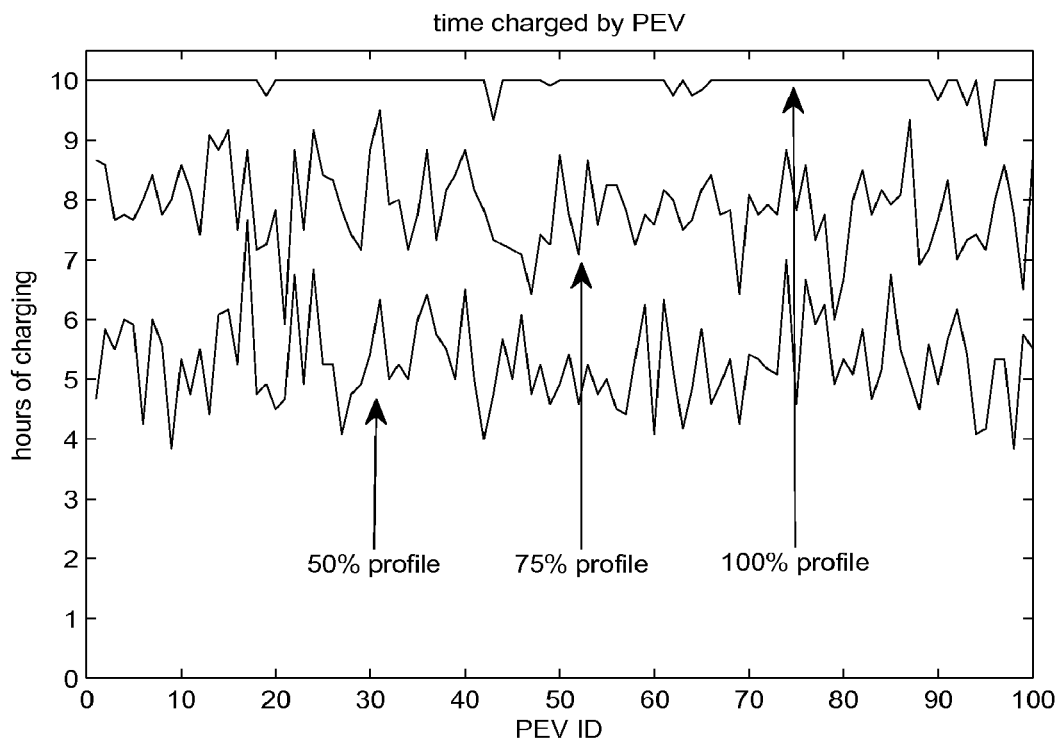
FIG. 4 depicts the ability of another embodiment of the present disclosure to democratically allocate charging resources to 100 PEVs when the power system capacity profile of FIG. 3A is scaled by 75% and 50%.

For the 75% case, 787.16 PEV·charge-hours were completed out the total of 832.5 available in the 15-hour window for a 94.55% utilization rate. For the 50% case, 527.41 PEV·charge-hours were completed out the total of 555 available in the 15-hour window for a 95.03% utilization rate. FIG. 4 shows that: (1) the automaton-based, random access approach to PEV charge management results in all users being impacted in a 'democratic' manner; and (2) the simplistic, uncoordinated approach still achieves good utilization of the available resources. Example set 2 (below) shows that variability from one user to the next can be further reduced with an automaton having more than just N=2 states.

Example 1C: Variable Demand, Variable Supply

Figure 5:
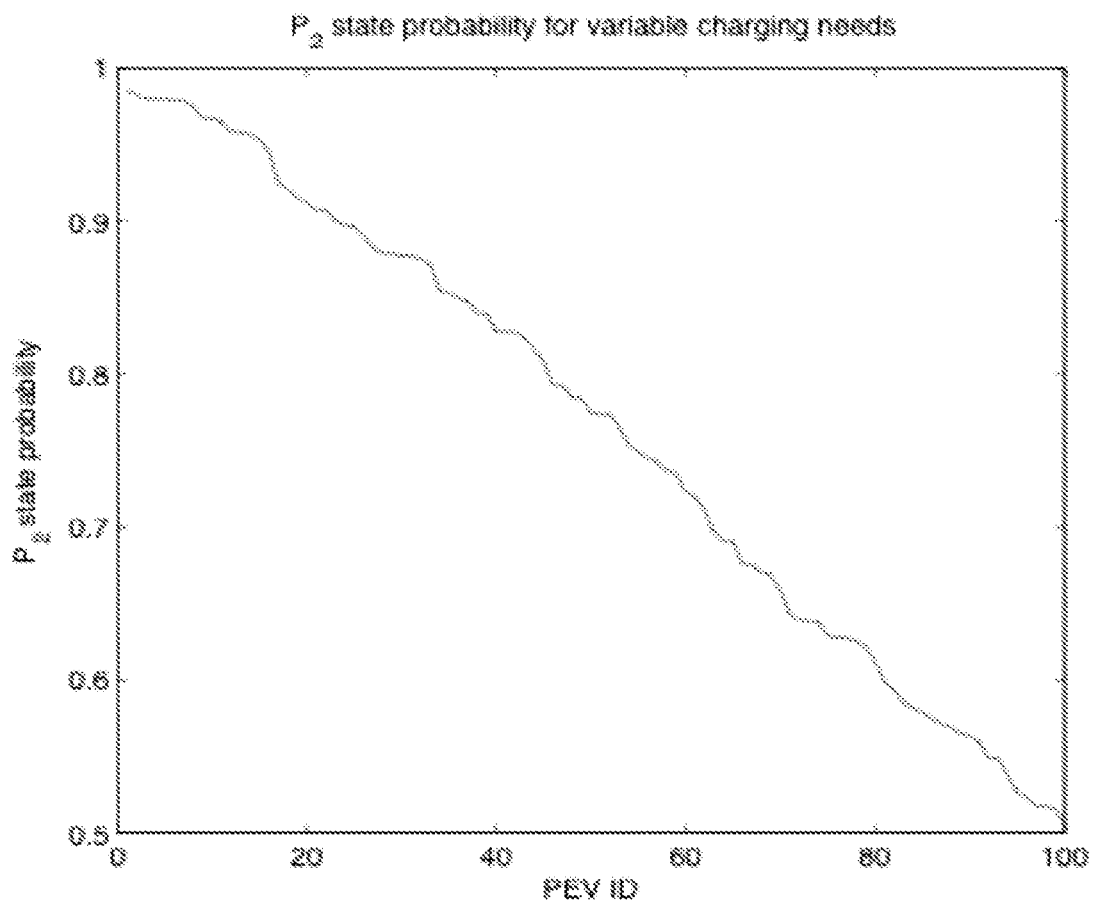
FIG. 5 shows the state probabilities for 100 PEVs with decreasing charging needs ranging from 100% to 50% charging in an embodiment of the present disclosure.

In Example 1C, a more realistic case was considered where the 100 vehicles have variable charge needs uniformly distributed from 5 to 10 hours (i.e., 50% and 100% charge, respectively). For this case, each PEV's automaton is unique not in structure (all PEVs employ a 2-state automaton), but in the probabilities assigned to each state. The probability for the highest state ($P_2$) was chosen to be simply the percentage of charge needed (see FIG. 5). The lower state probability ($P_1$) was set to half this value.

Figure 6A:
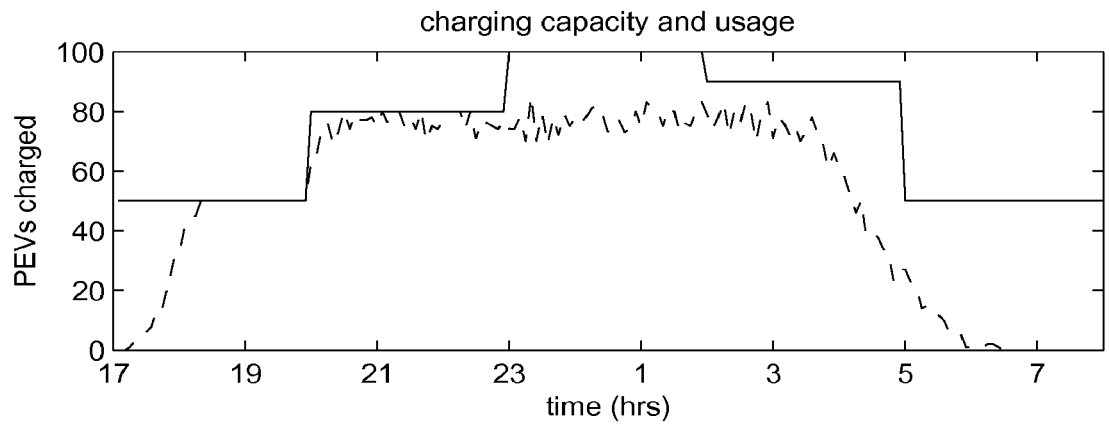
FIG. 6A is a graph of the capacity (solid) and load (dashed) of another exemplary embodiment of the present disclosure.
Figure 6B:
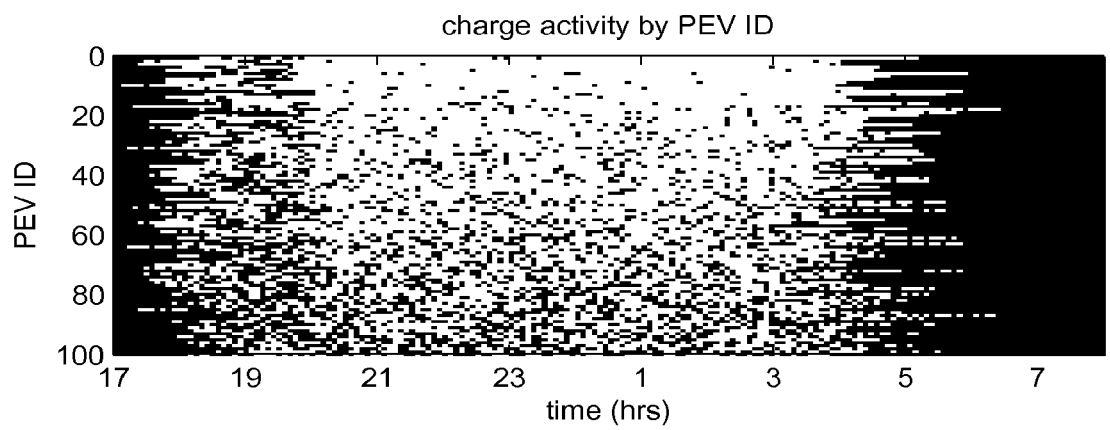
FIG. 6B depicts the charge activity of the embodiment of FIG. 6A over the 15-hour window by PEV ID.
Figure 6C:
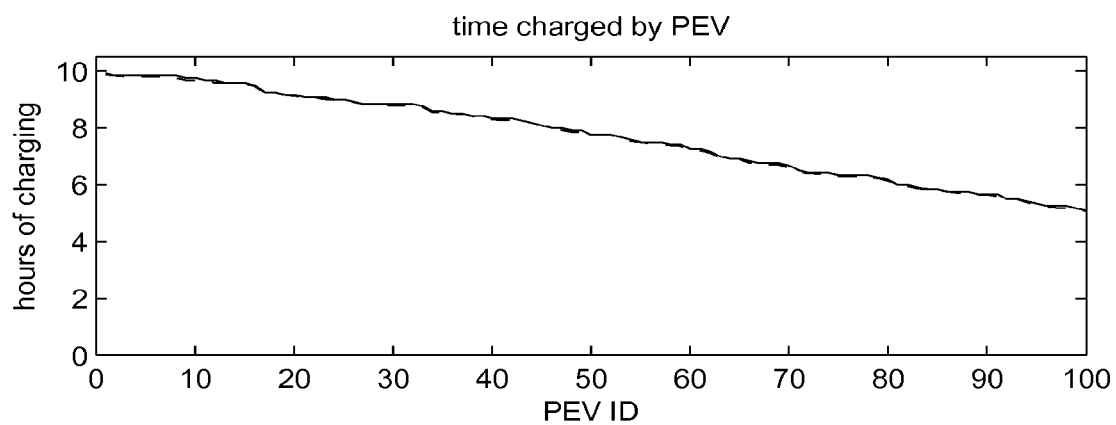
FIG. 6C depicts the charging completed by each PEV over the 15-hour window in the embodiment of FIGS. 6A and 6B, where the required charges of the PEVs varied (note that each PEV was completely charged during the window)

The same capacity profile as Example 1A and 1B was used. FIG. 6A shows the charging capacity and utilization over the 15-hour charging window. As the overall demand (775.4 PEV·charge-hours) is less than the capacity, there are times where not all PEVs are charging simultaneously. That is, with the random access approach where many PEVs have low needs, the charging activity becomes broadly distributed over the available window. This is more clearly shown in FIG. 6B where the PEVs with greatest need (smaller ID numbers) have more consistent charge activity than PEVs with lesser needs (larger ID numbers), especially as the capacity increases. Finally, as shown in FIG. 6C, each vehicle fully completes its required charge over the 15-hour window.

Example Set 2—3- and 4-State Automatons

To illustrate embodiments of the present method accounting for urgency, simple and readily-scalable examples (2A, 2B, and 2C) are provided in which the charging of 100 PEVs needs to be managed. For the examples of this set, it is assumed that system uses Level-1 home charging, and that each vehicle will achieve a full charge (0-100%) in 10 hours (i.e., 120, 5-minute power packets). Table 2 summarizes our simulation parameters for this set. For each of these examples we assume each PEV can receive a full 10-hour charge.

Figure 15:
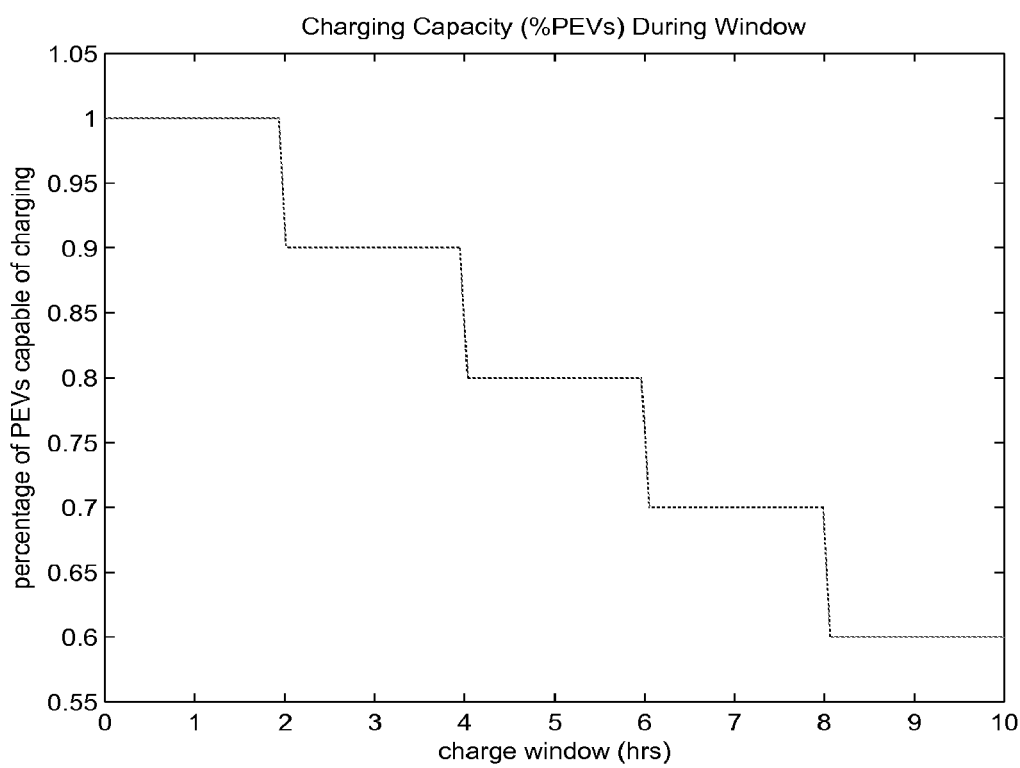
FIG. 15 is a graph showing the capacity of exemplary distribution system simulation in terms of percentage of 100 PEVs charging over the simulated 10-hour charge window.

The first two cases consider the same supply profile (FIG. 15) that initially accommodates all vehicles but becomes increasingly limited. To illustrate the approach we assume that 100 PEVs are connected to a feeder that has variable amount of power that can be allocated for charging (up to 192 kW).

TABLE 2

Simulation Parameters for Example Set 2

| Parameter | Value |
| --- | --- |
| Charge need per PEV | 10 hours (full charge - Level 1) |
| Power packet duration | 5 minutes |
| Example 2A | All PEVs at urgency 1.0; charge window 10 hours |
| Example 2B | PEV urgency evenly distributed between 0.2, 0.4, 0.6, 0.8 and 1.0; charge window of 10 hours. |

TABLE 2-continued

Simulation Parameters for Example Set 2

| Parameter | Value |
| --- | --- |
| Example 2C | Urgency profile of Example 2B; charge window is extended to 12.5 hours providing additional capacity |

There is a constant demand of 12,000 (120 charge intervals/PEV×100 PEVs) power packets in these cases but, with a charge window of only 10 hours, the overall the capacity is 80% of that need (i.e., 9,600 power packets). For the last example of this set, the profile is similar but the overall window length is 12.5 hours resulting in a full 12,000 power packets being available. The objectives of the management scheme are to: (1) provide priority charging for those customers willing to pay the upcharge; and (2) ensure all the system capacity is indeed used even if customers are stating low urgency.

Example 2A: Fixed Urgency, Variable Capacity

Figure 16A:
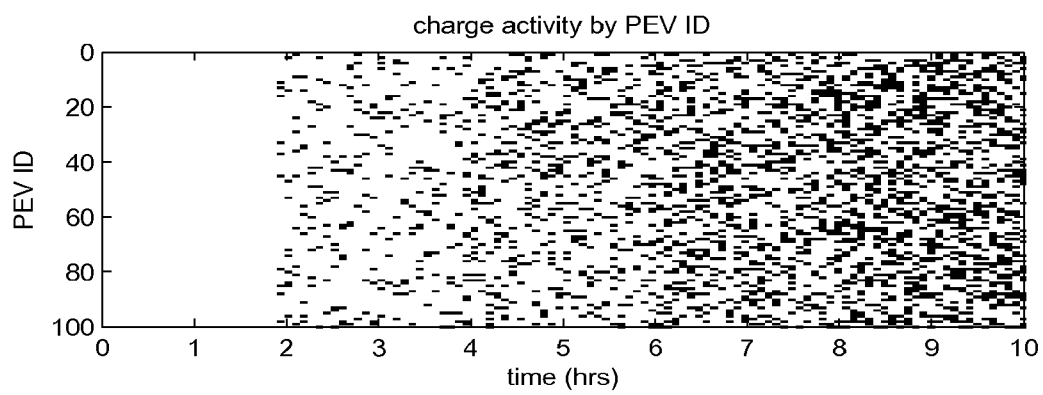
FIG. 16A depicts the charge activity over a 10-hour window by PEV ID using the automaton of FIG. 14.
Figure 16B:
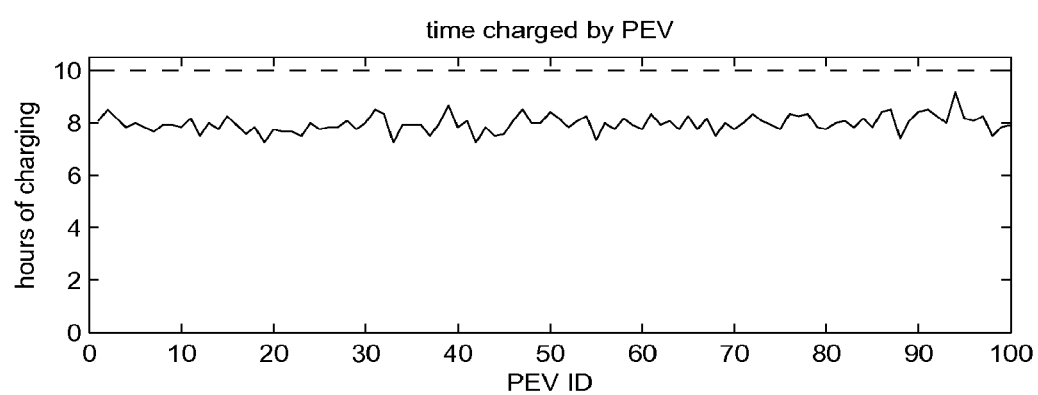
FIG. 16B depicts the charging completed by PEV over the 10-hour window of FIG. 16A.

For Example 2A, a scenario was simulated where all 100 PEVs require the maximum 10 hours (i.e., each PEV requires 120, 5-minute power packets) and all users have maximum urgency (i.e., p=1 in FIG. 14). Clearly this case will not accommodate all users fully. In fact, if the charge manager was ideally fair, it would not accommodate any customer fully. FIGS. 16A-16B illustrate the random access approach achieved through using the proposed approach. The system can initially serve all PEVs ("charging" indicated in white). As the feeder becomes constrained, all PEVs have reduced and random access to charging. Black indicates "not charging". As illustrated, on average each PEV receives 80% of its required charge and the system's capacity, albeit constrained, is fully utilized.

Example 2B: Variable Urgency, Variable Capacity

Figure 17:
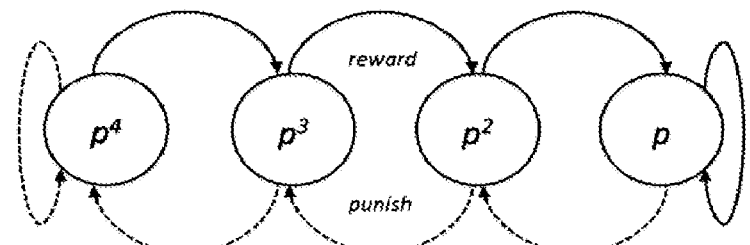
FIG. 17 depicts a four-state automaton of another embodiment of the present disclosure where p corresponds to customer's urgency.
Figure 18A:
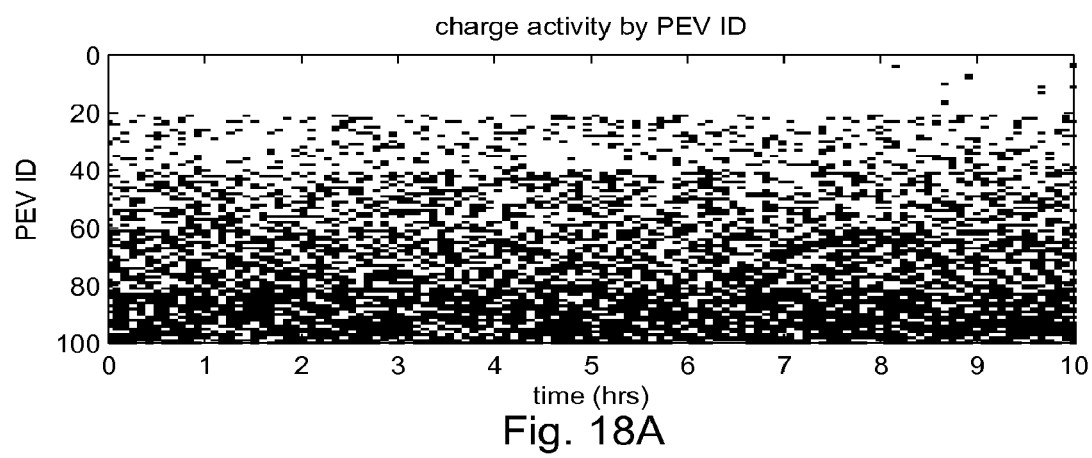
FIG. 18A depicts the charge activity over a 10-hour window by PEV ID using the automaton of FIG. 17 where PEVs have different 'urgency'.
Figure 18B:
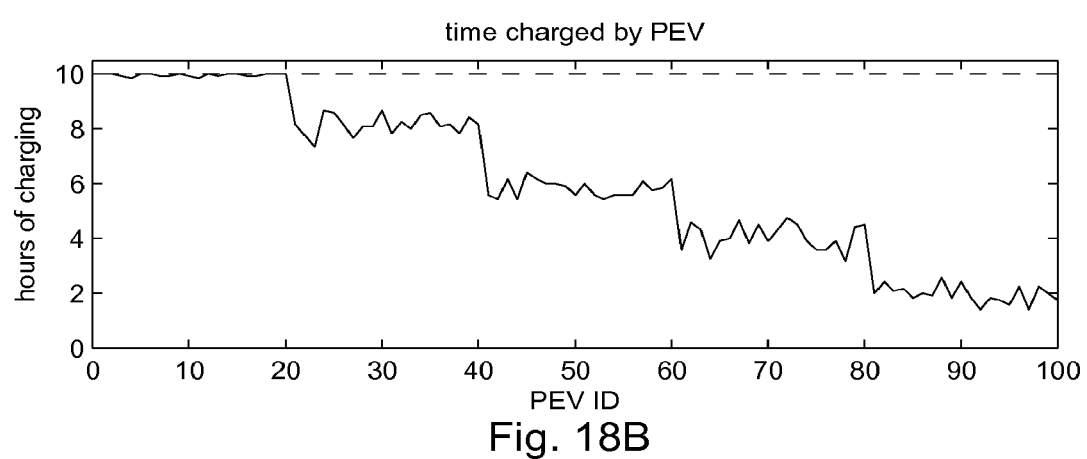
FIG. 18B depicts the charging completed by PEV over the 10-hour window of FIG. 18A.

In Example 2B, a scenario was simulated where different users assign different urgency to the day's charging. A low-urgency customer is willing to pay only the lowest rate for the received power and as a result the customer is willing to take less than a full charge. In contrast, the highest-urgency customer is always willing to take a charge regardless of price. This dichotomy was implemented through the automaton shown in FIG. 17 using the parameters presented in Table 3. Using the previous capacity profile (FIG. 15), the automaton approach indeed meets the objectives. Most urgent customers receive a power packet nearly every epoch to fully meet their need. Less urgent customers (ID>20) share the capacity. Specifically, it can be seen (by the white band at the top of FIGS. 18A-18B) that those PEVs (ID No. 1-20) with highest urgency (p=1) nearly all receive full charge. Through the completely uncoordinated accessing of the power distribution system, the approach manages to proportionally allocate the capacity by urgency as illustrated in Table 3.

TABLE 3

Additional Simulation Parameters for Example Set 2

| PEV ID | Urgency | Power packets received | Mean % completed | Deviation % |
|---|---|---|---|---|
| 1-20 | p = 1.0 | 118-120 | 99.5% | 0.6% |
| 21-40 | p = 0.8 | 88-104 | 81.5% | 3.6% |
| 31-60 | p = 0.6 | 67-74 | 58.1% | 3.0% |
| 61-80 | p = 0.4 | 38-57 | 40.6% | 4.7% |
| 81-100 | p = 0.2 | 17-29 | 19.7% | 3.2% |

While the automaton used in Example 2B (FIG. 17) achieves the expected results, it has the downside of not effectively utilizing the available capacity in the system. As many PEVs were set to have low urgency (e.g., 0.2 or 0.4) the frequency of their charge requests were such that the overall utilization of the available capacity was only ~60% in this experiment. As such, an alternative automaton that provides both priority and more effective resource utilization was simulated in Example 2C (below).

Example 2C: Variable Urgency, Sufficient Capacity

Figure 19:
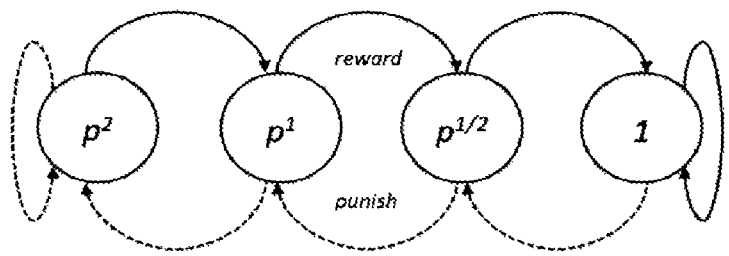
FIG. 19 depicts a four-state automaton of another embodiment of the present disclosure.

In Example 2C, a more realistic case was simulated where there is sufficient capacity in the system but there is a desire to prioritize the charging among users (again, by a customer's willingness to pay for that level of service). The automaton of Example 2B enabled priority but not the efficient use of the capacity. In Example 2C, even the lowest-urgency users were allowed to achieve a state where they will request a charge during an epoch with certainty (FIG. 19). Allowing low-urgency customers the ability to reach a p=1 state improves overall utilization of the distribution system capacity.

Figure 20A:
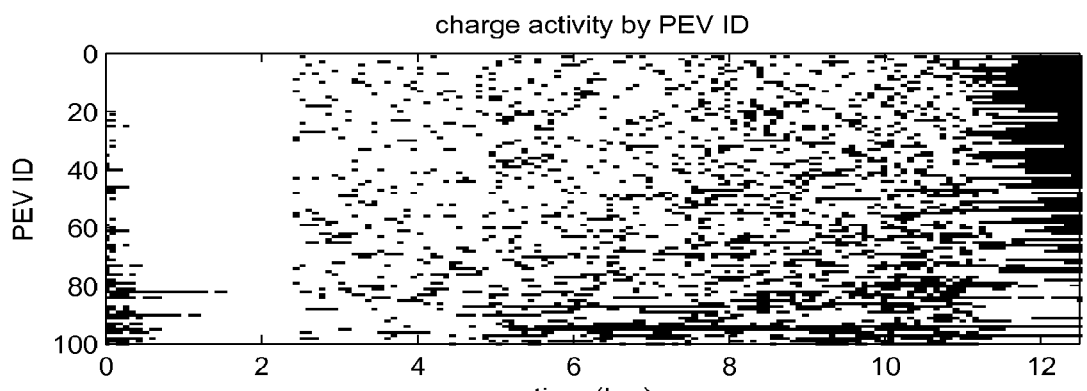
FIG. 20A depicts the charge activity over a 12.5-hour window by PEV ID using the automaton of FIG. 19.
Figure 20B:
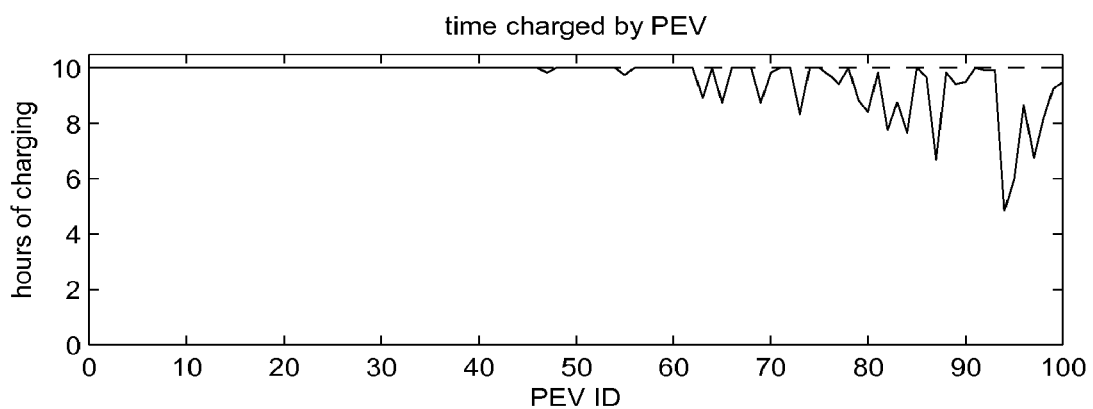
FIG. 20B depicts the charging completed (up to a full 10-hour charge) during the 12.5-hour window of FIG. 20A by PEV.
Figure 21:
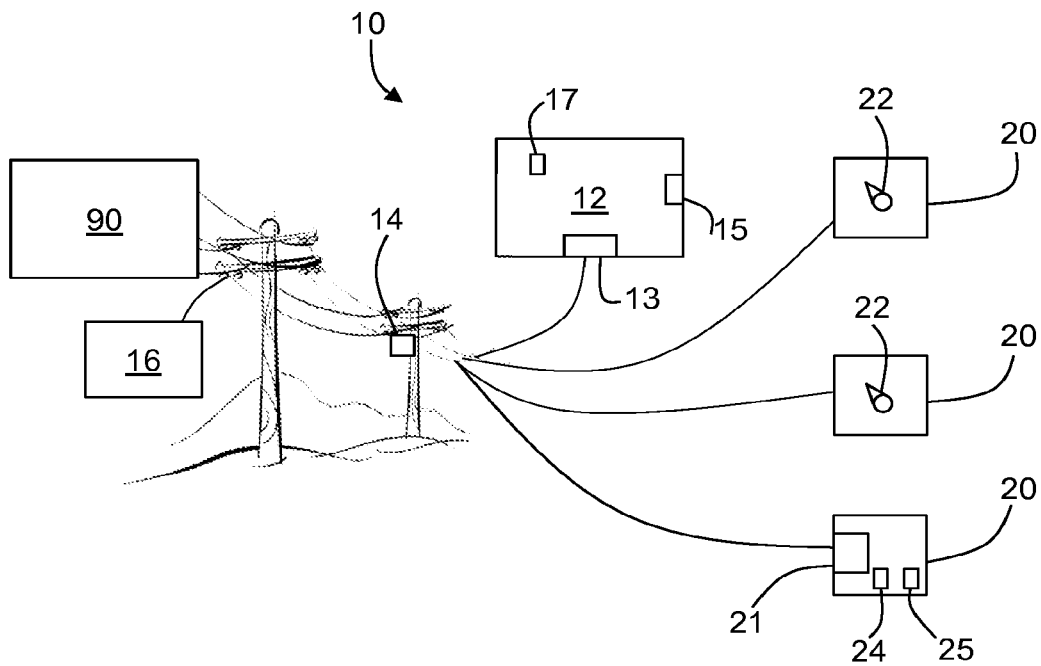
FIG. 21 is a diagram of a system according to an embodiment of the present disclosure.
Figure 22:
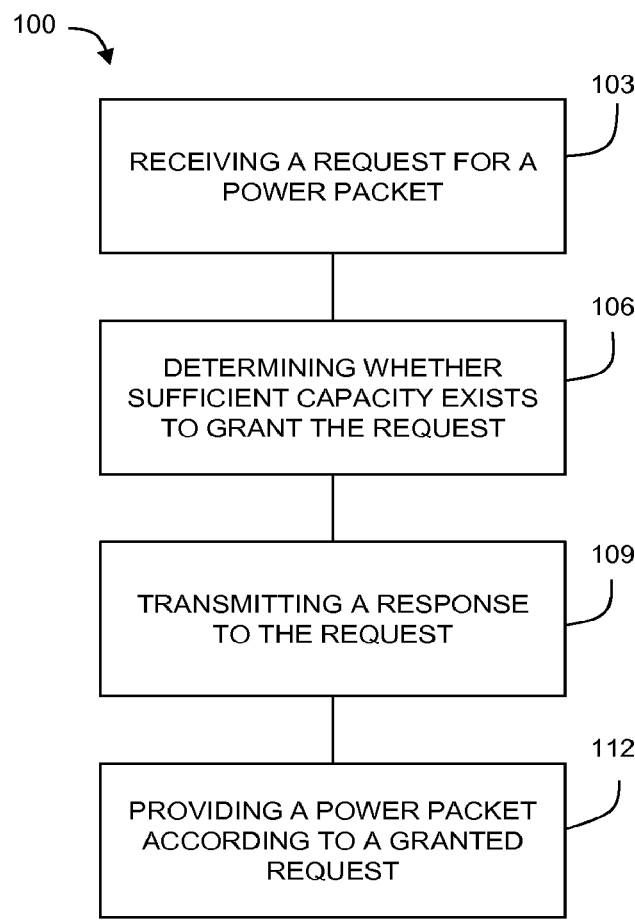
FIG. 22 is a flowchart of a method according to an embodiment of the present disclosure.
Figure 23:
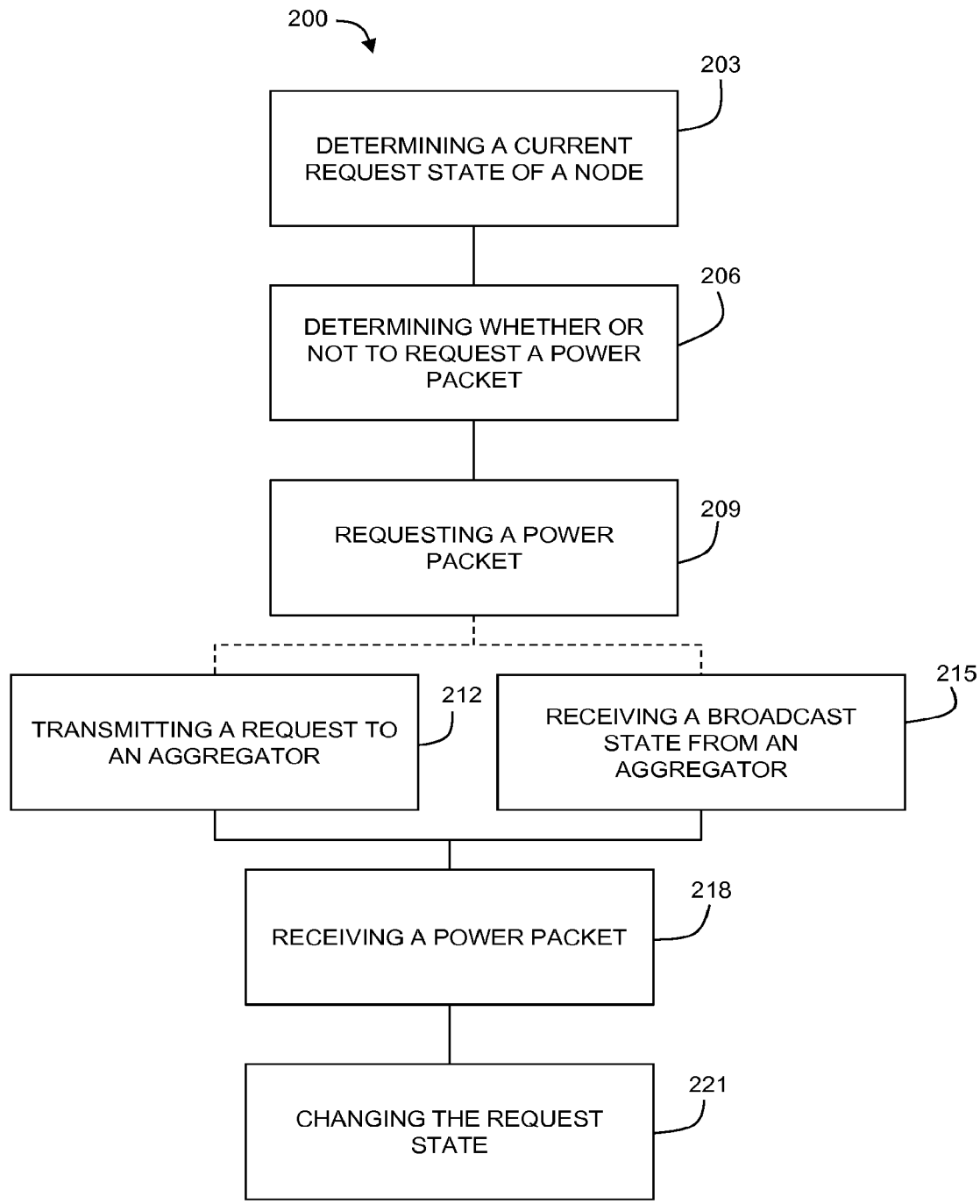
FIG. 23 is a flowchart of a method according to another embodiment of the present disclosure.

The experiment of the previous example was repeated with the charge window increased to 12.5 hours. This provides a capacity equal to the full PEV demand (i.e., 12,000 power packets). The results are seen in FIGS. 20A-20B.

Ideally, PEVs No. 1-20 would charge continuously for the first 10 hours (as they have the highest urgency) and then the remainder of the PEVs complete their charge in order of remaining urgency (i.e., 0.8 to 0.2). However, that would require coordination between the charge manager and the individual PEV chargers that, due to privacy and security considerations, was not desirable. FIG. 20A shows that all high-urgency PEVs complete their charge in about 11 hours. Furthermore, all PEVs with urgency greater than 0.6 receive effectively a full 10 hours of charging (FIG. 20B). Only the lowest-urgency PEVs do not complete full charging even though there was capacity (were the capacity to be ideally managed). Overall in this experiment, the capacity was 96.2% utilized (again, without any specific coordination by the charge manager, unique identification of individual customers, etc.)

Example Set 3—Comparison Charge Management Schemes

Example 3A: A Service Transformer Using Charge-Packet CM

For illustrative purposes, the charge-packet method is applied to the case of a constrained, low-voltage service transformer. In this example, a 30 kVA transformer serves 20 homes and 10 PEVs. The baseline residential load patterns were scaled to an average of 1 kVA per home (with a 0.9 power factor). The PEV travel patterns were randomly sampled from the New England travel survey data of the *National Household Travel Survey* ("*NHTS*") from the U.S. Dept. Transportation, Federal Highway Administration (2009). Each vehicle was assumed to charge using AC Level-2 charging rates (7 kW at 1.0 power factor). The electric vehicle characteristics roughly reflect those of the GM Volt. The travel efficiency is 4.46 km/kWh in electric mode, and 15.7 km/L in gasoline mode, with a 13 kWh usable battery capacity. While all of the simulation results in this example are for series Plug-in Hybrid Electric Vehicles (PHEV), the packetized method could just as easily be applied to pure battery electric vehicles (BEV). However, for the BEV case, the travel survey data are likely to be a less accurate representation of travel behavior, since BEV drivers may adjust their travel patterns given the reduced range of the vehicle. For this reason, PHEVs were selected for the simulation rather than BEVs.

For the charge-packet CM method, it was assumed that drivers can decide to choose the urgent mode, and that once chosen, this choice is constant during the day (the simulation duration). In the urgent mode, the vehicle requests charge regardless of the price of electricity, and its automaton stays at $P_1$ (the highest probability). In the non-urgent mode, the vehicle requests charge only during off-peak hours, and its automaton can go to lower states in case of charge denial.

For Example 3A, the following assumptions were used: (1) all PEVs were in the non-urgent charging mode (off-peak hours assumed to be from 8 p.m. to 8 a.m. the next day); (2) each PEV charger was managed with a three-state (N=3) automaton as illustrated in FIG. 7 (with request probabilities of $P_1$=1, $P_2$=0.5 and $P_3$=0.25); and (3) time epochs were set to 15 minutes.

Figure 8A:
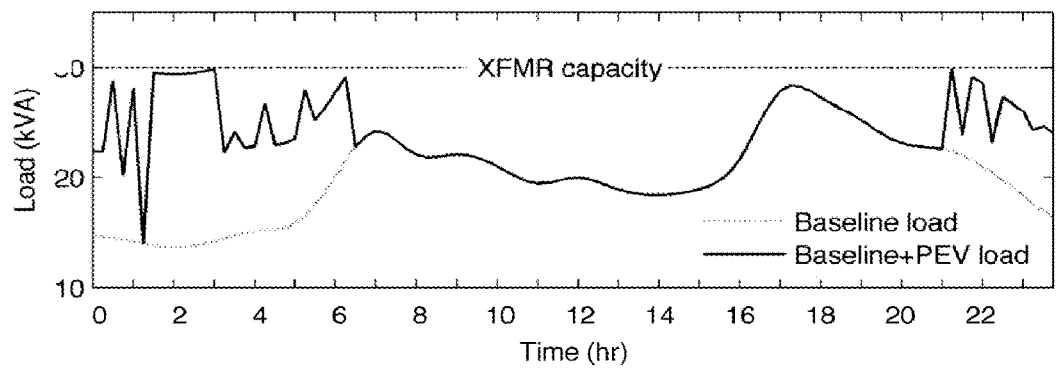
FIG. 8A is a graph of the load curve of another embodiment, showing the residential and the aggregate transformer load.
Figure 8B:
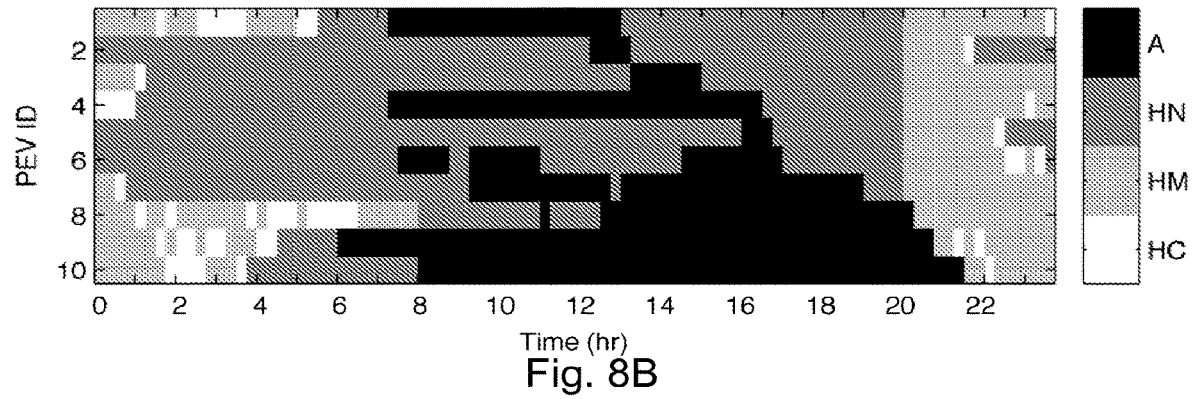
FIG. 8B depicts the PEV status of the embodiment of FIG. 8A, with gray shades indicating: A: PEV is away, HN: PEV is at home but not requesting for charge (either the battery is full, or it is during peak hours), HM: PEV requested a charge packet, but was denied to avoid transformer overload (charge mitigation), HC: PEV is at home and charging.
Figure 8C:
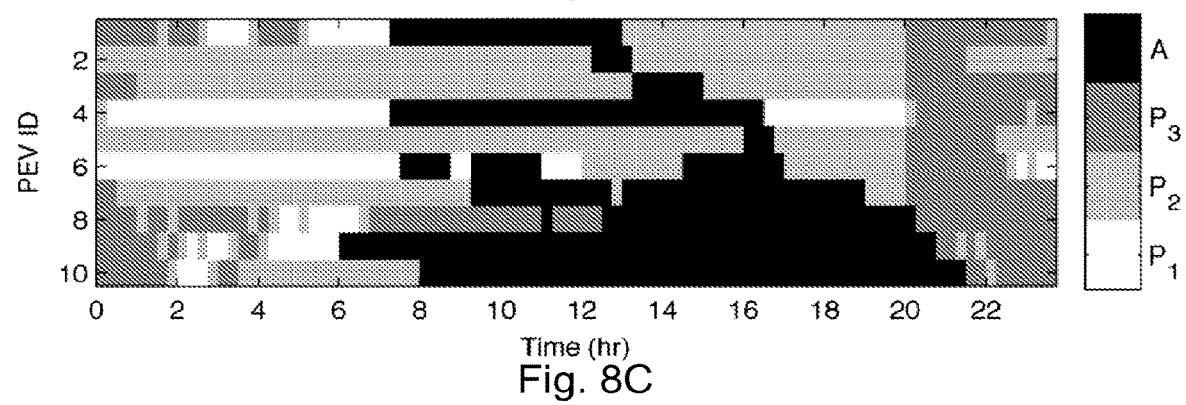
FIG. 8C depicts the PEV automaton state number with the gray shades showing each automaton's state at the end of the epoch for the embodiment of FIGS. 8A-8B.

FIGS. 8A-8C show the results of this simulation. FIG. 8A shows the transformer load with and without PEV charging. While the load approaches the 30 kVA limit, the constraint is satisfied over the entire period. FIG. 8B shows the status of each PEV status over the day, with white bands showing the randomly scattered 15-minute periods, during which each vehicle was charging. FIG. 8C shows the how the automaton states change during the day. During off-peak hours, the automatons are more likely to sit in the lower state ($P_3$). Recall that these states are determined locally, based only on whether the vehicle is permitted to charge after its most recent request. Despite the fact that there is no communication between the vehicles, the automaton states show a high correlation during each epoch.

Previous CM Schemes

The results in FIGS. 8A-8C illustrate that the decentralized charge-packet CM approach can be used to keep PEV loads below a desired limit. Examples 3B and 3C describe two comparison schemes that were used to evaluate the relative merits of the charge-packet approach of the present disclosure.

Example 3B: Simple First-Come, First-Served Charge Management

A simpler, decentralized approach to the CM problem would be to allow any vehicle to charge, and to continue to charge, so long as there was capacity available. Like the charge-packet method, this approach is decentralized and can be implemented with very limited communications. In the simulated implementation of this concept, PEVs are allowed to begin charging as soon as they arrive at home during both peak and off-peak hours, unless there is insufficient capacity in the transformer. Once charging begins, it continues until one of the following occurs: the battery is fully charged, the PEV leaves home, or the transformer becomes overloaded by an increase in non-PEV load. In the latter case, the transformer randomly chooses a vehicle to stop charging.

Figure 9A:
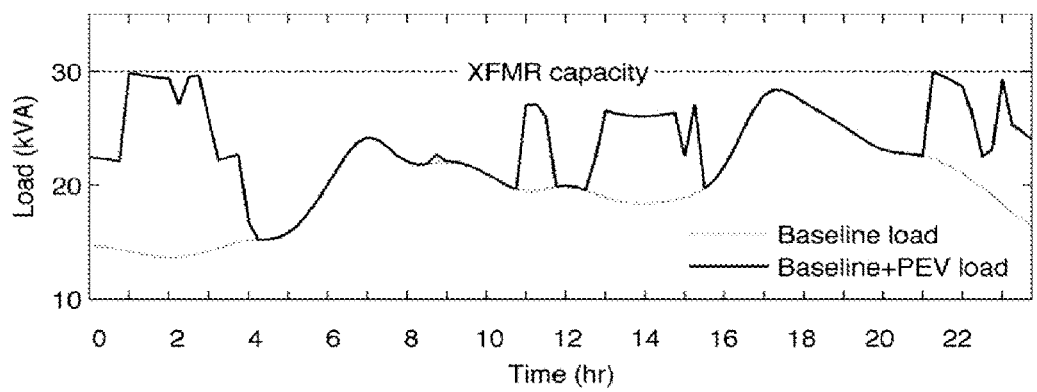
FIG. 9A is a graph showing the load curve of a simple charging method example.
Figure 9B:
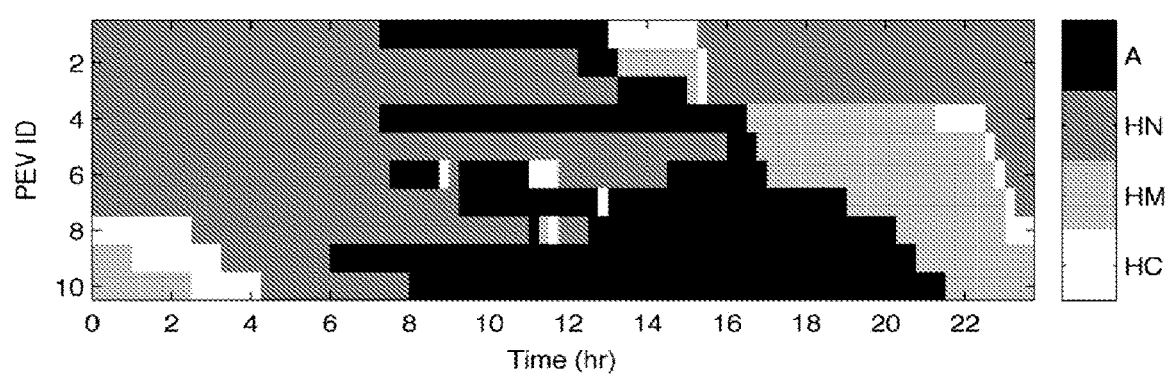
FIG. 9B depicts PEV status over time for the simple charging method example of FIG. 9A (using the same gray-scale codes as in FIG. 8B)

FIGS. 9A-9B illustrate results from this approach for the same 10-vehicle scenario as in Example 3A. In this case, vehicles have more continuous charging patterns (as seen by the continuity in the white bands in FIG. 9B). Because time-of-use prices are not considered by PHEVs in this method, they charge regardless of the time of day, as long as the transformer is not overloaded. In this case, vehicles that arrive later in the day or are initially denied charge are at a disadvantage because they cannot start charging until there is sufficient capacity to support additional PHEV charging. As a result PHEVs 9 and 10 do not start charging until the early hours of the morning (FIG. 9B). In contrast, the randomized nature of the packetized approach solves this fairness problem by requiring vehicles to request new packets at each epoch, providing vehicles with equal access to the resource, regardless of arrival times. In the packetized simulation (Example 3A), vehicles 9 and 10 charge during several intervals during the night, with the first packets shortly after vehicle arrival. In FIGS. 9A-9B, PHEVs 9 and 10 do not get any charge until after 1 and 2 am respectively. The extent to which vehicles get equal access to charging is quantified and compared below (see FIG. 13).

The FCFS charging scheme is a useful comparison scheme for two reasons. First, it illustrates how much charging costs increase, if PHEVs are not responsive to time-of-use prices, having the same travel pattern as in packetized charging method. Second, the FCFS method illustrates the potential of the packetized approach to provide equal access to constrained resources for all PHEVs.

Example 3C: Optimal Charge Management

The second comparison method is a centralized, optimal CM scheme. The optimization method was used to identify the minimum cost charge scenario. In order to ensure that every vehicle traveled their total demand in the survey data, and estimate daily travel costs under each charging scheme, all vehicles were assumed to be serial plug-in hybrid electric vehicles, with gasoline used after the usable battery capacity was expended.

The optimization problem is a mixed integer linear programming model. Only the objective function and modifications to the model are described here.

The objective in the optimization method is to minimize the retail costs to vehicle owners associated with traveling the miles described in the travel survey data. Because the vehicles are PHEVs, and the homes are charged for electricity using time-of-using pricing, there are three fuels that can be used for charging: on peak electricity, off peak electricity, or gasoline. The resulting objective (cost) function is given in (1):

$$C_t = \sum_{t=1}^{T} \sum_{v=1}^{N} \left[ \frac{\pi_e(t) \cdot P(v, t) \cdot h}{\eta_3} + \frac{\pi_g \cdot d_{CS}(v, t)}{\eta_g} \right] \quad (1)$$

where $\pi_e(t)$ and $P(v,t)$ are the price of electricity and the charging power of battery of vehicle v at time t, h is the charge epoch length, $\eta_e$ is the overall efficiency of the charging system ($\eta_e$=0.85), $\pi_g$=1.06 \$/L is the price of gasoline, $d_{CS}(v,t)$ is the distance traveled after the battery was depleted (charge-sustaining ("CS") mode), $\eta_g$=15.7 km/L is the CS mode vehicle efficiency, and T and N are the number of epochs and vehicles, respectively. In the present example, one-hour epochs were used (h=1), and P(v,t) was a continuous variable that varied between 0 and 7 kWh. In order to obtain consistent results, the following two constraints were added to previous models:

$$\sum_{v=1}^{N} P(v, t) + P_r(t) \le \overline{P} \ \forall \ t = 1, \ldots, T \quad (2)$$

$$P(v, t) \le P(v, t-1) \ \forall \ v, t: \quad (3)$$
$$d_{tot}(v, t) = d_{tot}(v, t-1) = 0 \ \& \ \pi_e(t) = \pi_e(t-1)$$

where $P_r(t)$ is the total residential load at time t, $\overline{P}$ is the load limit for the transformer or feeder, and $d_{tot}(v,t)$ is the total distance traveled by vehicle v at time t. Constraint (2) ensures that the transformer is not overloaded, and (3) forces PHEVs to charge as soon as possible, so long as the total cost is not affected. In other words, if the total distance traveled by PHEV v is zero in two consecutive time slots (if the PHEV is plugged in at home and the price of electricity is the same at time t and t−1), the charging power of vehicle v's battery should be greater at the earlier time slot.

Figure 10A:
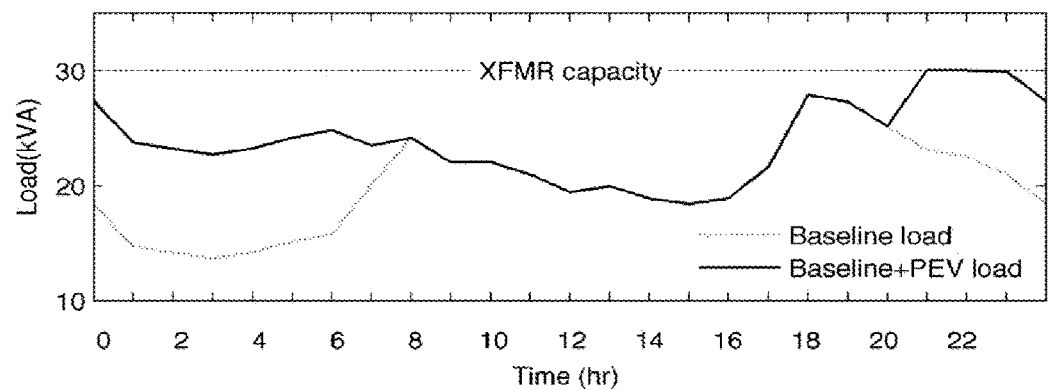
FIG. 10A is a graph showing the load curve of an optimal charge management example.
Figure 10B:
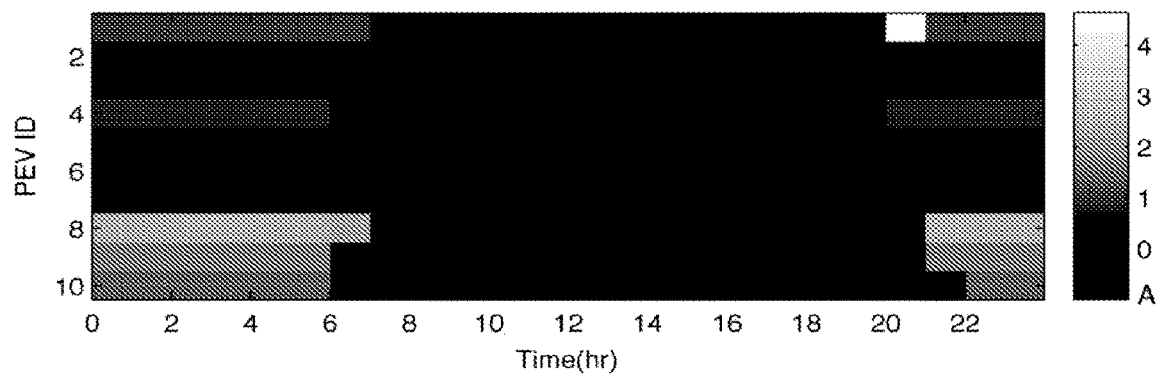
FIG. 10B depicts PEV status over time for the optimal charge management example of FIG. 10A where the gray levels show the amount of energy given to each PEV at each hour (in the grey-level bar, "A" shows the time when the PEV is away; and when at home, hourly charge quantities vary between 0 and 4.64 kWh, which is the maximum quantity delivered in this example)

FIGS. 10A-10B show results for this optimal charging scheme for the 10-PEV case considered in Examples 3A and 3B. As a result of allowing vehicles to charge at any rate, the approach chooses charge rates that are lower than the full Level 2 rate. This type of "Unidirectional V2G" has advantages in terms of more refined control, but requires additional communication and coordination. As expected, optimal CM fully utilizes the transformer capacity during off-peak hours, but only if travel plans are fully known. The other two methods also keep loads below the power limit, but with somewhat more variability.

Example Set 4—Further Comparisons of the Methods of Example Set 3

In this example set, simulation results are described for a larger case in which a 500 kVA medium voltage transformer is serving 320 homes with 1 kVA average load. Each home has two vehicles (i.e., 640 vehicles in total), either or both of which could be a PHEV depending on the PHEV penetration level. The number of homes was selected such that the peak residential load was below the transformer's rated load. It was assumed that customers were charged for electricity according to a two-rate, time-of-use residential tariff in which the peak (8 a.m. to 8 p.m.) electricity rate is $\pi_e(t)$=\$0.14/kWh and the off-peak rate is $\pi_e(t)$=\$0.10/kWh. These assumed values are representative of (though less extreme than) current retail time-of-use rates in the Northeastern US. For the packetized case, it was assumed that vehicles in urgent charging mode were charged the peak price (\$0.14/kWh) during peak hours. This \$0.04 difference between urgent and non-urgent rates is likely conservative, since the cost to utilities of providing non-urgent charging is likely to be only slightly higher than off-peak wholesale energy costs, which are frequently \$0.02-\$0.03/kWh in the Northeastern US.

In order to obtain a distribution of outcomes over a variety of likely travel patterns, 100 unique vehicle travel patterns were randomly selected from the survey data.

Comparing Packetized Charging to Optimal and FCFS Charge Management

A two-state automaton was modeled for the charge-packet method, with request probabilities of $P_1=1$ and $P_2=0.5$. Furthermore, vehicles were set to urgent mode (for the packetized approach) based on the solution from the optimization: if PHEV v charged during peak hours in the optimization results, v was set to urgent charging mode. Essentially this reflects the assumption that drivers were able to estimate their need for urgent charging.

Figure 11:
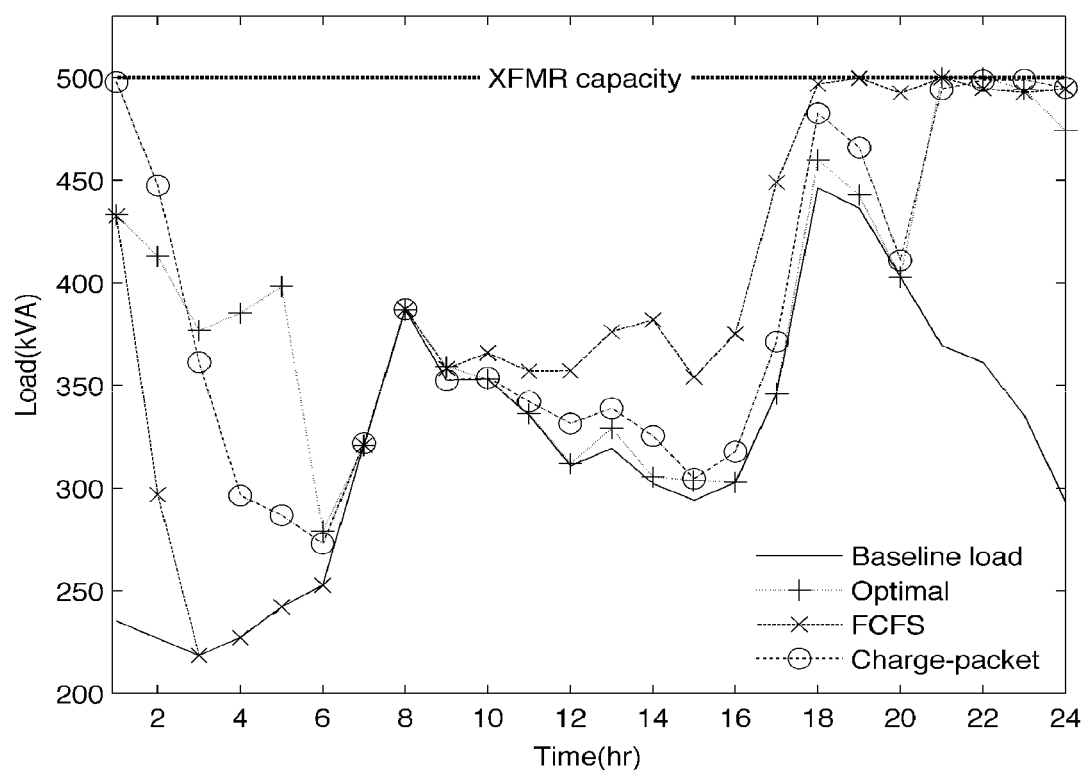
FIG. 11 is a graph depicting a daily load curve showing base load and the aggregate load when utilizing different charging methods for comparison.
Figures 12A, 12B, 12C, 12D:
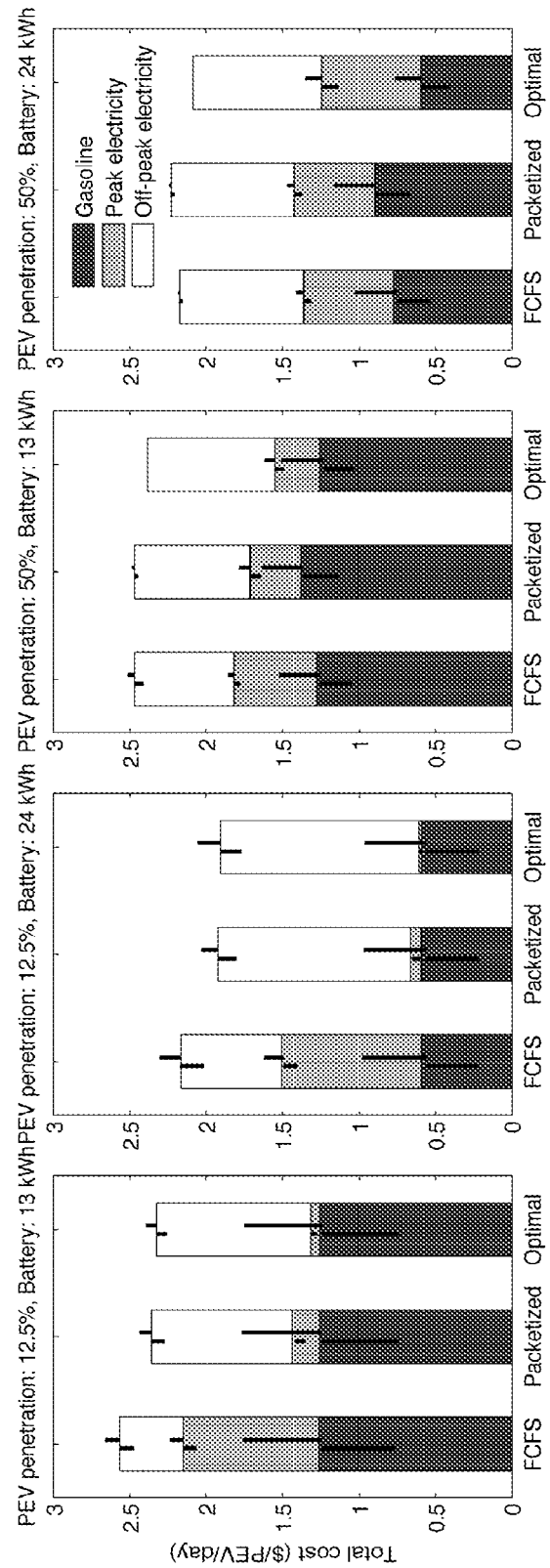
FIG. 12A-12D are graphs showing the average total travel costs in 100 Monte Carlo simulations, showing gasoline, peak and off-peak electricity costs separately in four case studies with different PEV penetrations and battery capacities (bars show the average and black lines show 10th to 50th and 50th to 90th percentile)

Three different levels of PHEV penetration: 12.5% (N=80), 25% (N=160) and 50% (N=320) were simulated. Note that these high penetration levels are relatively unlikely in the near term for the aggregate vehicle-fleet in most countries. However, it is not unlikely that some residential neighborhoods could have PEV penetrations that are substantially higher than that of aggregate. As a result of this, and the fact that temporal patterns in non-residential loads differ from residential patterns, we assume that the simulated PHEVs do not impact the two-tier time-of-use price. Also, it was assumed that the aggregate system load curve, which would include commercial and industrial customers, is different from the residential load shown in FIG. 11, which shows the baseline and total load for 25% PHEV penetration (160 PHEVs) for each CM scheme. In order to make a clear comparison, 1-hour time slots for the FCFS and optimization method were chosen, as well as 1-hour request intervals and packet lengths (i.e., epochs) for the charge-packet method. FIG. 11 shows that the PHEVs in the charge-packet case use slightly more peak hour charging, than in the optimization case, which increases the overall costs for the charge-packet method somewhat. However, the presumption is the unrealistic requirement that the central optimization approach can obtain perfect information about travel plans. What is notable is that the charge-packet scheme keeps loads below the limit, with costs that are nearly optimal as the load presented to the system is adjusted over time and distributed across PEVs in the system.

The average total travel cost per PHEV over 100 one-day Monte Carlo simulations was compared. Each vehicle was assigned a random travel pattern from the survey data. The same vehicle-travel pattern combinations were used identically for each scenario, to ensure a fair comparison. The results for two different PEV penetrations (12.5% and 50%), and two different battery capacities are shown in FIGS. 12A-12D. The gasoline, off-peak and on-peak electricity costs are shown separately. FIGS. 12A-12D show that the total travel cost of the charge-packet method is slightly more than that of the optimization method, but much less than the simple method. The charge-packet costs are slightly greater because urgency settings were constant during the day, based on the realistic assumption that drivers are not perfect optimizers. The simple method is more costly because in this case drivers do not differentiate their charging based on the price of electricity. The result is that in the simple method, vehicles consume more peak-hour electricity than in the other methods. One exception is the case of 50% penetration and 24 kWh batteries, where all charging methods use the entire transformer capacity during off-peak hours, but the optimization method can optimally allocate charging to those PEVs that cannot get peak-hour charging. In other charging methods, some PEVs that are not capable of receiving peak electricity (because of not being home) do not get enough charge overnight, and must use the most expensive fuel, gasoline. It should be noted that in the simulations, peak electricity is still cheaper than gasoline in terms of $/km travel.

Generally, in the higher PEV penetration scenarios, there was insufficient off-peak electricity to allow all vehicles to fully charge their batteries, resulting in more peak electricity usage for the optimization and packetized scenarios. Because of this, increased PEV penetrations resulted in a slight increase in travel costs for the optimization and packetized cases. For these two charging methods, in the 12.5% PEV penetration case vehicles can use more off-peak electricity than in the 50% PEV penetration case, where peak electricity is used more.

As one would expect, the results indicate that larger battery capacities result in reduced use of the most expensive fuel, gasoline, and thus reduce travel costs. However, the impact of the larger batteries is different in low and high PEV penetration cases. In the low penetration case, more off-peak electricity can be used for the larger battery as more transformer capacity is available; in the high penetration case, the transformer capacity is exhausted for both the 13 kWh and 24 kWh battery cases during the off-peak hours, making the benefits of larger batteries less clear.

Most importantly, these results show that the cost of using the packetized method is only 0.9% to 5.2% greater than what was found for the optimal CM case (as opposed to 3.1% to 14.1% for the simple CM scheme). The charge-packet method requires much less information from the PEV owner (only the choice of an urgency setting) and requires far less two-way communication than would be required to implement centralized optimization method. In summary, it was found that the charge-packet method can achieve near optimal costs, while preserving driver privacy and being robust to random changes in travel behavior.

Example Set 5—Comparing Variants of the Charge-Packet Method

The state machine used in the packetized PEV charger allows PEV charging to adapt to reduce the impact on the distribution system, such as overloaded transformers or feeders. However, different state machine probabilities will change the performance of the charge-packet method, particularly with respect to the burden on the communications infrastructure. To investigate the performance of the charge-packet method, the idea of differentiating between charge-packet lengths (i.e., the time epoch a PEV is given permission to charge) and request intervals (i.e., the time epoch between two requests for charge) was explored The charge-packet method was simulated with different state-machine probabilities, packet lengths (5-minute and one-hour), and request intervals (5-minute and one-hour). The results were compared across three metrics: (1) average total cost; (2) a measure of the extent to which the method provided each vehicle with equal access to the charging resources; and (3) the number of messages transmitted by the PEVs or the transformer, per vehicle-day, in the bi-directional (duplex) communication case.

One of the problems observed with the FCFS charging case (Example 3B) was that vehicles that began charging earlier than others, before a period in which charge mitigation occurred (typically early evening hours), were not required to stop charging when new vehicles arrived. As a result, vehicles that arrived later in the day frequently were not allowed to begin charging until capacity in the system was released, effectively giving them "less equal" access to charging resources. In order to measure the extent to which vehicles were given equal access to grid resources under different scenarios, an Equal Access Metric (EAM) was defined to assess the "fairness" of each method. For this purpose, the probability of charge mitigation was found for each vehicle v, $P_M(v)$, by dividing the number of time slots that the PEV charge request is denied by total number of time slots that the PEV is requesting charge from the transformer. $P_M$ was computed only for off-peak hours, when all vehicles, whether in urgent or non-urgent mode, were requesting charge. Given the standard deviation of $P_M(v)$ over all v, $\sigma(P_M)$, EAM was calculated as follows:

$$EAM = 1 - \sigma(P_M). \quad (4)$$

$\sigma(P_M)$ ranges between 0 and 1, which means that EAM has the same range. Therefore, a method with perfectly equal access will have EAM=1, and lower values of EAM indicate that some vehicles are given more access than others. The rationale for this metric is that as long as all the PEVs are mitigated with the same probability (i.e., the same ratio of mitigation to total requests) the method maintains its fairness.

Communication burden was measured by counting the number of messages exchanged over the communications network per vehicle per day. Following the two-way communication system design, each charge packet request was assumed to require one message submission to the aggregator. If the PEV receives a reply (one message), this means that the request is approved, otherwise the charge request is denied.

Figure 13:
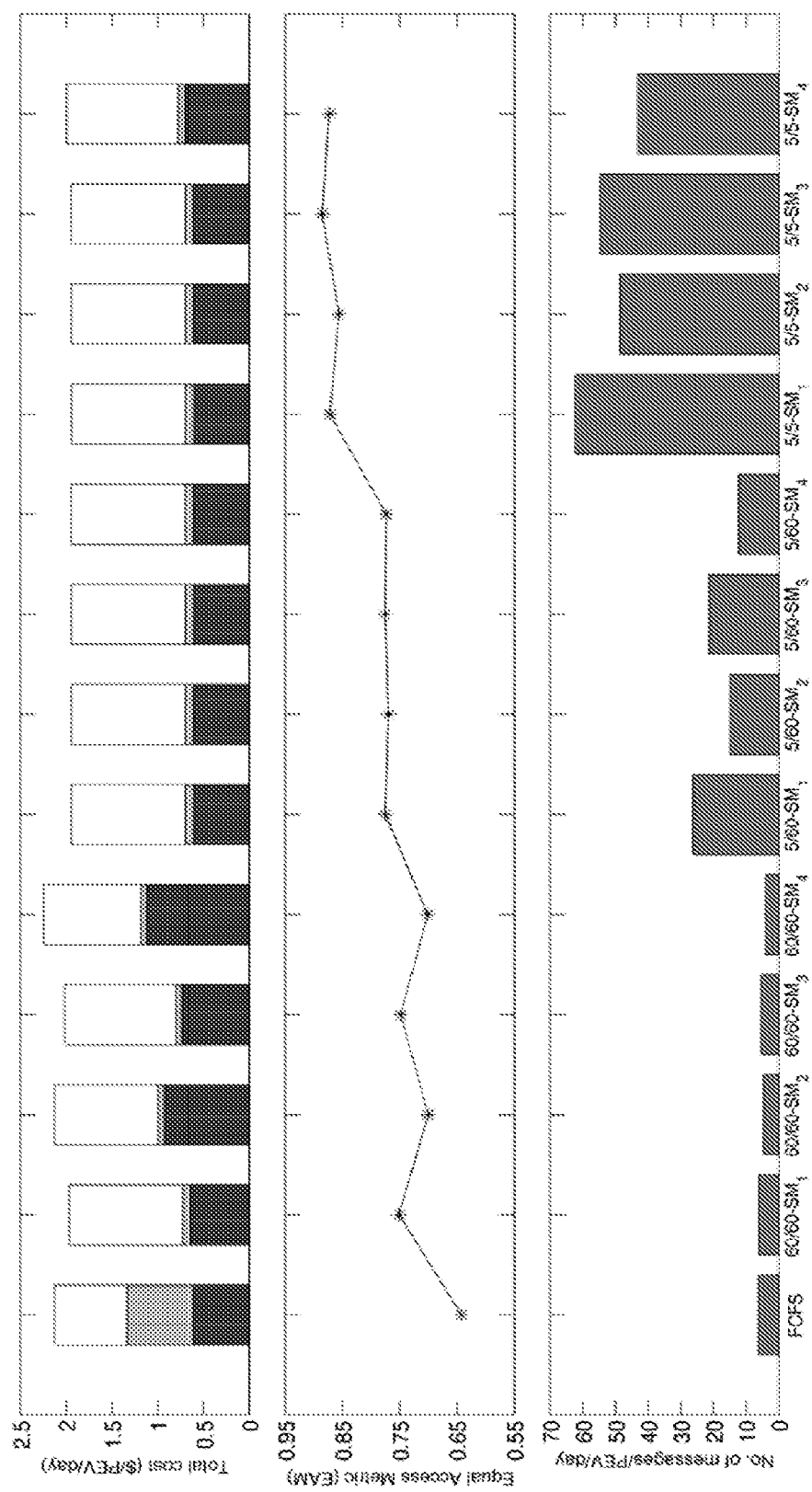
FIG. 13 is a set of graphs comparing simple charging and variations in the present charge-packet method, wherein the top graph shows the average total costs over 100 Monte Carlo simulations separating gasoline, peak, and off-peak electricity, the middle graph shows how the resources are equally accessible to the consumers, and the bottom graph compares the communication burden for different methods assuming the requesting design approach of the charge-packet method ($t_1$ and $t_2$ in $t_1/t_2$ show the request interval and the packet length respectively; different state machines are defined with these state probabilities: $SM_1$: $\{P_1=1, P_2=0.5\}$, $SM_2$: $\{P_1=1, P_2=0.5, P_3=0.25\}$, $SM_3$: $\{P_1=0.8, P_2=0.4\}$, $SM_4$: $\{P_1=0.8, P_2=0.4, P_3=0.2\}$)

FIG. 13 shows these three metrics, for three different charge time-interval combinations and four different state machines, along with results for the simple charging method. Time-interval combinations are defined using the notation $t_1/t_2$, in which $t_1$ is the interval of times between requests and $t_2$ is the length of the charge packet, both in minutes. The three time-interval combinations compared were 60/60, 5/60 and 5/5, and the state machines were $SM_1$: {$P_1=1$, $P_2=0.5$}, $SM_2$: {$P_1=1$, $P_2=0.5$, $P_3=0.25$}, $SM_3$: {$P_1=0.8$, $P_2=0.4$} and $SM_4$: {$P_1=0.8$, $P_2=0.4$, $P_3=0.2$}. As expected, smaller request intervals and charge-packet lengths reduced charging costs, but increased communication costs. The 5/60 gives about the same travel cost as 5/5, but at the expense of fairness (reduced EAM). It is possible that excessively frequent on/off cycles could have adverse effects on the battery or charging systems. If this was the case, the 5/60 method could be preferable, given that the increase in cost is negligible. Note that 5/60 outperforms 60/60 in terms of equal access.

The results also suggest that using state-machines with N=3 rather than N=2 states, or with lower transition probabilities, can substantially reduce the burden of CM on the communications system. However, these changes also result in small increases in travel costs. If communications bandwidth is not a constraint, the 5/5 charge-packet is superior (of those simulated) in terms of both total cost and equal access.

Example Set 6

An aggregator for providing power to one or more nodes is described. The aggregator comprises a source interface in electrical communication with an electrical power source, and a load interface in communication with the one or more nodes. The aggregator is configured to receive requests, from the one or more nodes, for power packets of electrical power, the power packets configured as electrical power for a finite duration. The aggregator is configured to determine whether to grant or deny each request based on the availability of electrical power from the electrical power source, and provide a power packet to each node according to the corresponding request determination.

A node for requesting electrical power from an aggregator comprises an aggregator interface in electrical communication with the aggregator, and a state register for recording a node state. The node is configured to retrieve a node state from the state register, to determine, based on a request probability, whether or not to request a power packet having a finite duration, for a time interval, wherein the request probability corresponds to the retrieved node state, and request a power packet from the aggregator according to the request determination. The node is further configured to receive a response to the request, and change the node state recorded in the state register based upon the received response. The node is configured to request a power packet by receiving a broadcast state from an aggregator.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. An apparatus, comprising:
  a processor communicatively coupled to a non-transitory computer readable storage medium containing at least one request probability and communicatively coupled to an energy-consuming device;
  wherein the processor is configured to introduce a randomization to the device's consumption of power from an electric power grid by breaking up the device's energy consumption into a plurality of discrete power packets consumed during time intervals, wherein at each time interval the processor is configured to use the at least one request probability to determine whether to make a request to an aggregator for the device to consume power during a time interval such that the probability the processor will make a request for the device to consume power in a given time interval is equal to the at least one request probability.

2. The apparatus of claim 1, wherein the processor is configured to determine a length of the time intervals and/or configured to determine a length of the power packets.

3. The apparatus of claim 2, wherein one or more of a probability function, a local sensor measurement, and an aggregator signal indicating a current state of the electric power grid are used as inputs by the processor to determine the length of the time intervals and/or the length of the power packets.

4. The apparatus of claim 1, wherein the processor is configured to vary a length of the time intervals and/or vary a length of the power packets.

5. The apparatus of claim 1, wherein the processor is configured to randomly vary a length of the time intervals and/or randomly vary a length of the power packets.

6. The apparatus of claim 5, wherein the processor is configured to execute a random-access control method to randomly vary the length of the time intervals and/or randomly vary the length of the power packets.

7. The apparatus of claim 1, wherein the processor is configured to change the request probability.

8. The apparatus of claim 1, wherein the at least one request probability includes a plurality of request probabilities, wherein one or more of an aggregator signal, a local sensor signal, a state of the device, a user-controlled priority selector, and a price of electricity are used by the processor as an input to select one of the plurality of request probabilities for determining whether to make a request to consume power during a time interval.

9. The apparatus of claim 1, wherein the processor is configured to transition the device between power consumption states at the beginning and end of a power packet.

10. The apparatus of claim 9, wherein the power consumption state transition at the beginning of a power packet is from off to on, or from a non-zero power consumption state to a higher or lower power consumption state.

11. The apparatus of claim 9, wherein the power consumption state transition at the end of a power packet is from on to off, or from a non-zero power consumption state to a higher or lower power consumption state.

12. The apparatus of claim 1, wherein the processor is configured to be communicatively coupled to the aggregator, wherein the aggregator transmits an aggregator signal, the processor configured to instruct the device to consume a power packet during a time interval when the processor makes a request for a power packet and the aggregator signal indicates a power packet can be consumed.

13. The apparatus of claim 12, wherein the aggregator signal approves the request by transmitting the aggregator signal directly to the processor in response to the request.

14. The apparatus of claim 12, wherein the aggregator signal approves the request by broadcasting the aggregator signal, the processor configured to request a power packet by listening for the broadcasted aggregator signal and instructing the device to consume a power packet in response to a value of the aggregator signal indicating the device can consume the power packet.

15. The apparatus of claim 14, wherein the processor is configured to listen for at least one of a periodic, continuous, or random aggregator signal broadcast.

16. The apparatus of claim 1, wherein the at least one request probability includes a plurality of request probabilities, the processor configured to select one of the plurality of request probabilities according to a value of an aggregator signal for determining whether to make a request.

17. The apparatus of claim 16, wherein the processor is configured to select a lower request probability in response to an aggregator signal denying a power packet request and select a higher request probability in response to an aggregator signal granting a power packet request.

18. The apparatus of claim 1, wherein the at least one request probability includes a plurality of request probabilities, the processor configured to select one of the plurality of request probabilities according to a current price of electricity.

19. The apparatus of claim 1, wherein the at least one request probability is a probability function that defines the request probability as inversely related to a price of electricity.

20. The apparatus of claim 1, wherein the processor is further configured to receive an electric power grid status signal, the processor configured to consume a power packet in response to determining to make a request to consume power and determining the electric power grid status signal indicates a power packet can be consumed.

21. The apparatus of claim 20, wherein the electric power grid status signal is at least one of an aggregator signal, a voltage signal, a temperature signal, a frequency signal, or an electrical current signal.

22. A method of distributing electrical power, comprising:
electronically communicating with a plurality of power consuming devices connected to an electric power grid, the plurality of power consuming devices configured to break up their energy consumption into repeatedly consumed power packets consumed during corresponding time intervals, wherein each of the plurality of power consuming devices are configured to access a request probability to independently determine whether to make a request to an aggregator to consume power during a time interval such that the probability one of the power consuming devices will make a request in a given time interval is equal to the request probability and the demand for electrical power from the plurality of power consuming devices is randomized; and
transmitting a status signal of the electric power grid for use by ones of the plurality of power consuming devices that have determined to request a power packet.

23. The method of claim 22, wherein the transmitting includes transmitting the status signal as a broadcast signal to the plurality of power consuming devices.

24. The method of claim 23, wherein the broadcast signal is transmitted periodically, continuously, or randomly.

25. The method of claim 22, further comprising receiving a power packet request from ones of the plurality of power consuming devices, the transmitting step including transmitting the status signal directly to the power consuming devices that transmitted the power packet requests.

26. The method of claim 22, wherein the status signal is an indication of whether the power consuming devices can draw power from the electric power grid.

27. The method of claim 22, further comprising determining the status signal of the electric power grid, the determining including receiving ancillary services data.

28. The method of claim 27, wherein the ancillary services data includes at least one of grid capacity data, electric power grid component status information, and weather information.

29. The method of claim 28, wherein the electric power grid component status information includes electric power grid component temperature data.

30. The method of claim 27, wherein the ancillary services data includes electricity price information.

31. The method of claim 22, wherein the status signal is a status of a region of the electric power grid, the transmitting including transmitting the status signal for use by ones of the plurality of power consuming devices located in the region and that have determined to request a power packet.

32. The method of claim 31, further comprising determining the status signal in response to receiving status data for the region of the electric power grid.

33. The method of claim 32, wherein the status data for the region of the electric power grid includes a status of at least one of a medium-voltage distribution transformer, an underground cable, a low-voltage service transformer, and a distribution substation.

34. The method of claim 31, further comprising receiving a power packet request from ones of the plurality of power consuming devices, the power packet requests including power consuming device location information, the transmitting step including transmitting a status signal for a region of the electric power grid that corresponds to the location information.

35. The method of claim 22, further comprising receiving a status signal for a first region of the electric power grid and determining a status signal for a sub-region of the first region, wherein the transmitting step includes transmitting a status signal of the sub-region for use by ones of the plurality of power consuming devices located in the sub-region.

36. The method of claim 35, wherein the determining a status signal for the sub-region includes receiving status information associated with the sub-region of the electric power grid.

37. The method of claim 22, wherein the plurality of power consuming devices configured to operate independently, resulting in the plurality of power consuming devices asynchronously requesting power packets.

* * * * *